(12) United States Patent
Thudor et al.

(10) Patent No.: US 11,367,247 B2
(45) Date of Patent: Jun. 21, 2022

(54) METHOD, APPARATUS AND STREAM FOR ENCODING/DECODING VOLUMETRIC VIDEO

(71) Applicant: InterDigital VC Holdings, Inc., Wilmington, DE (US)

(72) Inventors: Franck Thudor, Cesson-Sevigne (FR); Bertrand Chupeau, Cesson-Sevigne (FR); Renaud Dore, Cesson-Sevigne (FR); Thierry Tapie, Cesson-Sevigne (FR); Julien Fleureau, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/766,355

(22) PCT Filed: Nov. 6, 2018

(86) PCT No.: PCT/US2018/059367
§ 371 (c)(1),
(2) Date: May 22, 2020

(87) PCT Pub. No.: WO2019/103838
PCT Pub. Date: May 31, 2019

(65) Prior Publication Data
US 2020/0380765 A1    Dec. 3, 2020

(30) Foreign Application Priority Data

Nov. 23, 2017    (EP) .................................... 17306629

(51) Int. Cl.
*G06T 15/08*    (2011.01)
*G06T 7/73*    (2017.01)
(Continued)

(52) U.S. Cl.
CPC ................. *G06T 15/08* (2013.01); *G06T 7/75* (2017.01); *G06T 15/04* (2013.01); *G06T 17/10* (2013.01); *H04N 19/597* (2014.11)

(58) Field of Classification Search
None
See application file for complete search history.

(56) References Cited

U.S. PATENT DOCUMENTS

| 7,586,489 B2 | 9/2009 | Muller-Fischer et al. |
| 2015/0317822 A1* | 11/2015 | Haimovitch-Yogev ...................... H04N 5/23206 345/419 |
| 2017/0347120 A1* | 11/2017 | Chou ................... H04N 19/147 |

OTHER PUBLICATIONS

Chen et al., "Transforming a 3-D LiDAR Point Cloud into a 2-D Dense Depth Map Through a Parameter Self-Adaptive Framework", IEEE Transactions on intelligent Transportation Systems, vol. 18, Issue 1, Jan. 2017, 12 pages.

(Continued)

*Primary Examiner* — Tize Ma
(74) *Attorney, Agent, or Firm* — Condo Roccia Koptiw LLP

(57) ABSTRACT

Encoding/decoding data representative of a 3D representation of a scene according to a range of points of view can involve generating a depth map associated with a part of the 3D representation according to a parameter representative of a two-dimensional parameterization associated with the part and data associated with a point included in the part, wherein the two-dimensional parameterization can be responsive to geometric information associated with the point and to pose information associated with the range of points of view. A texture map associated with the part can be generated according to the parameter and data associated with the point. First information representative of point density of points in a part of the part can be obtained. The depth map, (Continued)

texture map, parameter, and first information can be included in respective syntax elements of a bitstream.

16 Claims, 11 Drawing Sheets

(51) Int. Cl.
   *G06T 17/10* (2006.01)
   *G06T 15/04* (2011.01)
   *H04N 19/597* (2014.01)

(56) References Cited

OTHER PUBLICATIONS

Ochotta et al., "Image-Based Surface Compression", Computer Graphics Forum, vol. 27, No. 6, Sep. 2008, pp. 1647-1663.
Sultani et al., "Kinect 3D Point Cloud Live Video Streaming", International Conference on Communication, Management and Information Technology (ICCMIT 2015), Procedia Computer Science, vol. 65, pp. 125-132, Elsevier B.V., 2015.
Ochotta et al., "Compression of Point-Based 3D Models by Shape-Adaptive Wavelet Coding of Multi-Height Fields", Eurographics Conference on Point-Based Graphics, Gosiar, Germany, Jun. 2004, pp. 103-112.
Alexa et al., "Computing and Rendering Point Set Surfaces", IEEE Transactions on Visualization and Computer Graphics, vol. 9, No. 1, Jan.-Mar. 2003, pp. 3-15.
He et al., "A Novel Way to Organize 3D LiDAR Point Cloud as 2D Depth Map Height Map and Surface Normal Map", 2015 IEEE International Conference on Robotics and Biomimetics (ROBIO), Zhuhai, China, Dec. 6, 2015, 6 pages.
Golla et al., "Real-time Point Cloud Compression", 2015 IEEE/RSJ International Conference on Intelligent Robots and Systems (IROS), Hamburg, Germany, Sep. 28, 2015, pp. 5087-5092.
Bletterer et al., "Point Cloud Compression using Depth Maps", Electronic Imaging, vol. 2016, No. 21, Feb. 14, 2016, 6 pages.
Anonymous, "Technical Report of the Joint Ad Hoc Group for Digital Representations of Light/Sound Fields for Immersive Media Applications", International Organization for Standardization, ISO/IEC JTC1/SC29/WG01 & WG11, Geneva, Switzerland, May 2016, 82 pages.
Schnabel, R., "Efficient Point-Cloud Processing with Primitive Shapes", Bonn University, Bonn, Germany, Doctoral Thesis in Mathematics, Dec. 2009, 174 pages.
Berger et al., "State of the Art in Surface Reconstruction from Point Clouds", Eurographics 2014—State of the Art Report, Strasbourg, France, Apr. 2014, 27 pages.
Francois et al., "Depth-Based Segmentation", IEEE Transactions on Circuits and Systems for Video Technology, vol. 7, No. 1, Feb. 1997, pp. 237-240.
ITU-T, "Advanced Video Coding for Generic Audiovisual Services", International Standard ISO/IEC 14496-10, Recommendation ITU-T H.264, Series H: Audiovisual and Multimedia Systems, Infrastructure of Audiovisual Services—Coding of Moving Video, Jun. 2019, 836 pages.
ITU-T, "High Efficiency Video Coding", Series H: Audiovisual and Multimedia Systems, 3D-HEVC, Recommendation ITU-T H.265 Annex G (pp. 507-525) and I (pp. 549-641), Dec. 2016, 135 pages.
ITU-T, "High Efficiency Video Coding", Recommendation ITU-T H.265 Standard, Series H: Audiovisual and Multimedia Systems, Infrastructure of Audiovisual Services—Coding of Moving Video, Dec. 2016, 664 pages.
ITU-T, "Information Technology—Digital Compression and Coding of Continuous-Tone Still Images—Requirements and Guidelines", International Standard ISO/IEC 10918-1, ITU-T Recommendation T.81 (1992)—Corrigendum 1, Series T: Terminals for Telematic Services, Technical Corrigendum 1: Patent Information Update, Jan. 2004, 12 pages.
Lafruit et al., "Technical Report of the Joint Ad Hoc Group for Digital Representations of Light/Sound Fields for Immersive Media Applications", ISO/IEC JTC1/SC29/WG1N72033 ISO/IEC JTC1/SC29/WG11N16352, Geneva, Switzerland, Jun. 2016, pp. 1-79.
Malik et al., "Contour and Texture Analysis for Image Segmentation", International Journal of Computer Vision, vol. 43, No. 1, 2001, pp. 7-27.

* cited by examiner

METHOD, APPARATUS AND STREAM FOR ENCODING/DECODING VOLUMETRIC VIDEO

CROSS REFERENCE TO RELATED APPLICATIONS

This application is the national stage entry under 35 U.S.C. § 371 of International Application PCT/US2018/059367, filed Nov. 6, 2018, which was published in accordance with PCT Article 21(2) on May 31, 2019, in English, and which claims the benefit of European Patent Application No. 17306629.1 filed Nov. 23, 2017.

1. TECHNICAL FIELD

The present disclosure relates to the domain of volumetric video content. The present disclosure is also understood in the context of the encoding and/or the formatting of the data representative of the volumetric content, for example for the rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and also prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume, allowing limited translation of the head and parallax experience. This second context is a valuable trade-off between free navigation and passive viewing conditions of a seated audience member.

While increasing the user experience in immersive context, the amount of data to be transported to the renderer is very important and may be an issue.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding data representative of a 3D representation of a scene into a bitstream, the 3D representation being according to a range of points of view, the method comprising:

generating at least a depth map associated with at least a part of the 3D representation according to at least a parameter representative of at least a two-dimensional parameterization associated with the at least a part and data associated with at least a point comprised in the at least a part, the at least a two-dimensional parameterization being responsive to geometric information associated with the at least a point and to pose information associated with the range of points of view;

generating at least a texture map associated with the at least a part according to the at least a parameter and data associated with the at least a point comprised in the at least a part;

obtaining a first information representative of point density of points comprised in at least a part of the at least a part of the 3D representation;

encoding the at least a depth map into a first syntax element of the bitstream, the at least a texture map into a second syntax element of the bitstream, the at least a parameter into a third syntax element of the bitstream, the first information into a fourth syntax element of the bitstream and a second information representative of a mapping between the at least a two-dimensional parameterization and corresponding at least a depth map and at least a texture map into a fifth syntax element of the bitstream.

The present disclosure also relates to a device configured to encode data representative of a 3D representation of a scene into a bitstream, the 3D representation being according to a range of points of view, the device comprising a memory associated with at least one processor configured to:
- generate at least a depth map associated with at least a part of the 3D representation according to at least a parameter representative of at least a two-dimensional parameterization associated with the at least a part and data associated with at least a point comprised in the at least a part, the at least a two-dimensional parameterization being responsive to geometric information associated with the at least a point and to pose information associated with the range of points of view;
- generate at least a texture map associated with the at least a part according to the at least a parameter and data associated with the at least a point comprised in the at least a part;
- obtain a first information representative of point density of points comprised in at least a part of the at least a part of the 3D representation;
- encode the at least a depth map into a first syntax element of the bitstream, the at least a texture map into a second syntax element of the bitstream, the at least a parameter into a third syntax element of the bitstream, the first information into a fourth syntax element of the bitstream and a second information representative of a mapping between the at least a two-dimensional parameterization and corresponding at least a depth map and at least a texture map into a fifth syntax element of the bitstream.

The present disclosure relates to a device configured to encode data representative of a 3D representation of a scene into a bitstream, the 3D representation being according to a range of points of view, the device comprising:
- a generator configured to generate at least a depth map associated with at least a part of the 3D representation according to at least a parameter representative of at least a two-dimensional parameterization associated with the at least a part and data associated with at least a point comprised in the at least a part, the at least a two-dimensional parameterization being responsive to geometric information associated with the at least a point and to pose information associated with the range of points of view;
- a generator configured to generate at least a texture map associated with the at least a part according to the at least a parameter and data associated with the at least a point comprised in the at least a part;
- an interface configured to obtain a first information representative of point density of points comprised in at least a part of the at least a part of the 3D representation;
- an encoder configured to encode the at least a depth map into a first syntax element of the bitstream, the at least a texture map into a second syntax element of the bitstream, the at least a parameter into a third syntax element of the bitstream, the first information into a fourth syntax element of the bitstream and a second information representative of a mapping between the at least a two-dimensional parameterization and corresponding at least a depth map and at least a texture map into a fifth syntax element of the bitstream.

The present disclosure also relates to a device configured to encode data representative of a 3D representation of a scene into a bitstream, the 3D representation being according to a range of points of view, the device comprising:
- means for generating at least a depth map associated with at least a part of the 3D representation according to at least a parameter representative of at least a two-dimensional parameterization associated with the at least a part and data associated with at least a point comprised in the at least a part, the at least a two-dimensional parameterization being responsive to geometric information associated with the at least a point and to pose information associated with the range of points of view;
- means for generating at least a texture map associated with the at least a part according to the at least a parameter and data associated with the at least a point comprised in the at least a part;
- means for obtaining a first information representative of point density of points comprised in at least a part of the at least a part of the 3D representation;
- means for encoding the at least a depth map into a first syntax element of the bitstream, the at least a texture map into a second syntax element of the bitstream, the at least a parameter into a third syntax element of the bitstream, the first information into a fourth syntax element of the bitstream and a second information representative of a mapping between the at least a two-dimensional parameterization and corresponding at least a depth map and at least a texture map into a fifth syntax element of the bitstream.

The present disclosure relates to a method of decoding data representative of a 3D representation of a scene from a bitstream, the 3D representation being according to a range of points of view, the method comprising:
- decoding, from the bitstream, at least a parameter representative of at least a two-dimensional parameterization of at least a part of the 3D representation;
- decoding, from the bitstream, data representative of at least a texture map associated with the at least a part of the 3D representation;
- decoding, from the bitstream, data representative of at least a depth map associated with the at least a part of the 3D representation;
- determining data associated with at least a point comprised in the at least a part of the 3D representation from the at least a parameter, the data representative of at least a texture map, the data representative of at least a depth map, a first information obtained from the bitstream and representative of point density of points comprised in at least a part of the at least a part of the 3D representation, and a second information obtained from the bitstream and representative of a mapping between the at least a two-dimensional parameterization and corresponding at least a depth map and at least a texture map.

The present disclosure relates to a device configured to decode data representative of a 3D representation of a scene from a bitstream, the 3D representation being according to a range of points of view, the device comprising a memory associated with at least one processor configured to:
- decode, from the bitstream, at least a parameter representative of at least a two-dimensional parameterization of at least a part of the 3D representation;

decode, from the bitstream, data representative of at least a texture map associated with the at least a part of the 3D representation;

decode, from the bitstream, data representative of at least a depth map associated with the at least a part of the 3D representation;

determine data associated with at least a point comprised in the at least a part of the 3D representation from the at least a parameter, the data representative of at least a texture map, the data representative of at least a depth map, a first information obtained from the bitstream and representative of point density of points comprised in at least a part of the at least a part of the 3D representation, and a second information obtained from the bitstream and representative of a mapping between the at least a two-dimensional parameterization and corresponding at least a depth map and at least a texture map.

The present disclosure relates to a device configured to decode data representative of a 3D representation of a scene from a bitstream, the 3D representation being according to a range of points of view, the device comprising:

a decoder configured to decode, from the bitstream, at least a parameter representative of at least a two-dimensional parameterization of at least a part of the 3D representation;

a decoder configured to decode, from the bitstream, data representative of at least a texture map associated with the at least a part of the 3D representation;

a decoder configured to decode, from the bitstream, data representative of at least a depth map associated with the at least a part of the 3D representation;

a processor configured to determine data associated with at least a point comprised in the at least a part of the 3D representation from the at least a parameter, the data representative of at least a texture map, the data representative of at least a depth map, a first information obtained from the bitstream and representative of point density of points comprised in at least a part of the at least a part of the 3D representation, and a second information obtained from the bitstream and representative of a mapping between the at least a two-dimensional parameterization and corresponding at least a depth map and at least a texture map.

The present disclosure relates to a device configured to decode data representative of a 3D representation of a scene from a bitstream, the 3D representation being according to a range of points of view, the device comprising:

means for decoding, from the bitstream, at least a parameter representative of at least a two-dimensional parameterization of at least a part of the 3D representation;

means for decoding, from the bitstream, data representative of at least a texture map associated with the at least a part of the 3D representation;

means for decoding, from the bitstream, data representative of at least a depth map associated with the at least a part of the 3D representation;

means for determining data associated with at least a point comprised in the at least a part of the 3D representation from the at least a parameter, the data representative of at least a texture map, the data representative of at least a depth map, a first information obtained from the bitstream and representative of point density of points comprised in at least a part of the at least a part of the 3D representation, and a second information obtained from the bitstream and representative of a mapping between the at least a two-dimensional parameterization and corresponding at least a depth map and at least a texture map.

According to a particular characteristic, the first information comprises an indication on which parts of the 3D representation have a point density below a determined density value.

According to a specific characteristic, the first information is obtained by detecting at least a boundary between objects of the scene in at least an image of the scene according to a point of view comprised in the range of points of view, the parts of the 3D representation having a point density below a determined density value corresponding to areas of the scene comprising a boundary.

According to another characteristic, the first information is obtained by calculating a number of points comprised in each volume element of a plurality of volume elements of the 3D representation to obtain the point density of each volume element, and by comparing the point density of each volume element with the determined density value.

According to a further characteristic, additional points are generated in parts of the 3D representation having a point density below a determined density value in addition to the points obtained from the decoded at least a depth map.

The present disclosure also relates to a bitstream carrying data representative of a 3D representation of a scene, the 3D representation being according to a range of points of view, wherein the data comprises:

at least a parameter representative of at least a two-dimensional parameterization of at least a part of part of the 3D representation, the parameters being obtained according to geometric information associated with at least a point of the at least a part of the 3D representation and according to pose information associated with the range of points of view;

data representative of at least a texture map associated with the at least a part of the 3D representation and determined from the at least a parameter and data associated with the at least a point comprised in the at least a part of the 3D representation;

data representative of at least a depth map associated with the at least a part of the 3D representation and determined from the at least a parameter and data associated with the at least a point comprised in the at least a part of the 3D representation;

a first information representative of point density of points comprised in at least a part of the at least a part of the 3D representation; and a second information representative of a mapping between the at least a two-dimensional parameterization and corresponding at least a depth map and at least a texture map.

The present disclosure also relates to a computer program product comprising program code instructions to execute the steps of the method of encoding or decoding data representative of a 3D representation of a scene, when this program is executed on a computer.

The present disclosure also relates to a (non-transitory) processor readable medium having stored therein instructions for causing a processor to perform at least the above-mentioned method of encoding or decoding data representative of a 3D representation of a scene.

4. LIST OF FIGURES

The present disclosure will be better understood, and other specific features and advantages will emerge upon reading the following description, the description making reference to the annexed drawings wherein.

Figure 3:
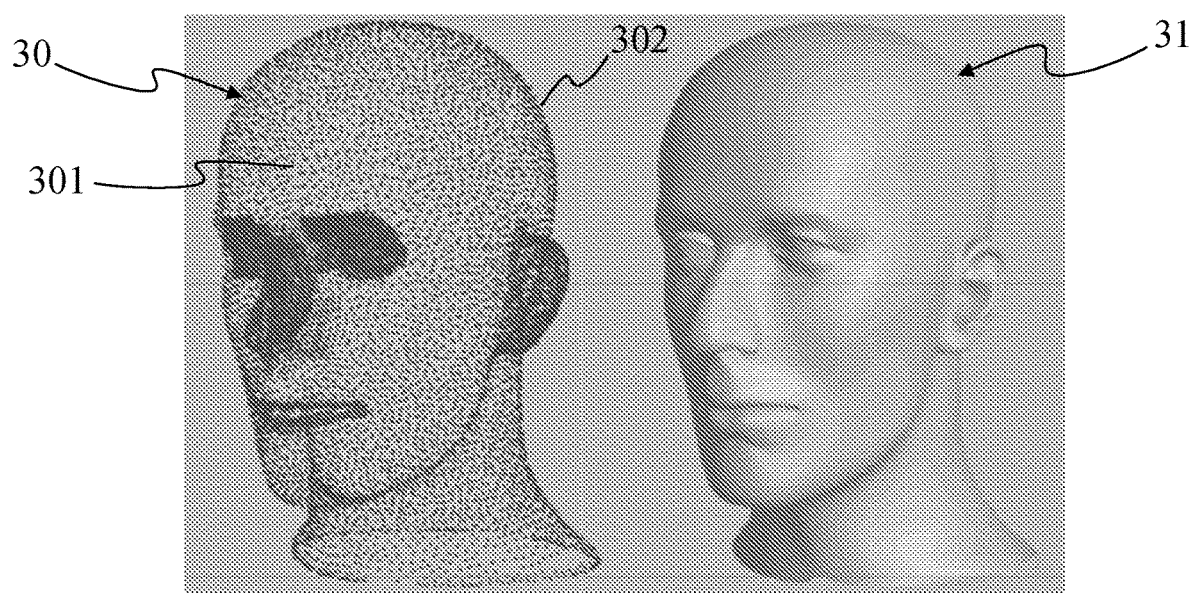
FIG. 3 shows representations of the 3D scene, or part of it, acquired with the acquisition device of FIGS. 2A and 2B, according to a particular embodiment of the present principles.
Figure 9:
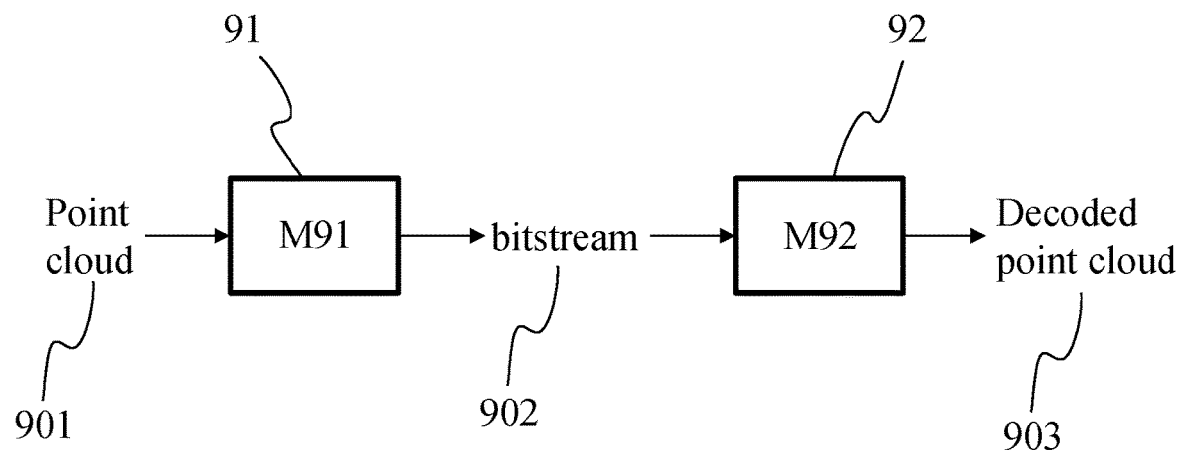
Figure 10:
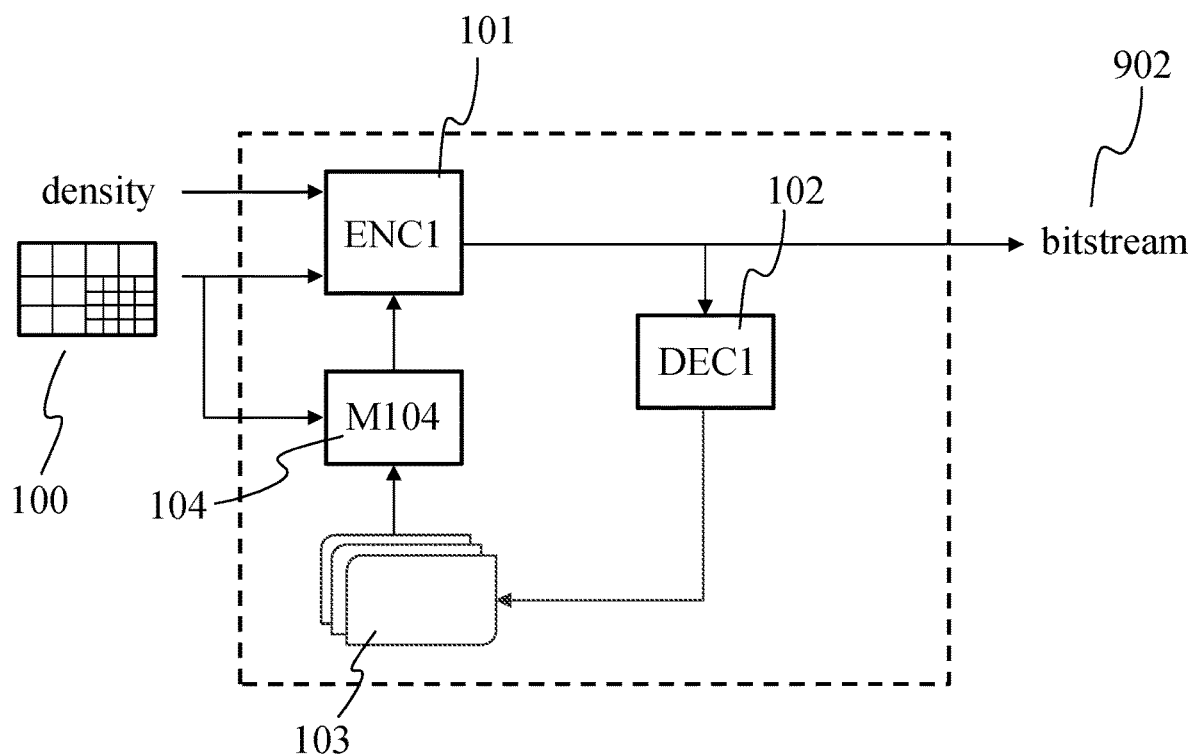
Figure 11:
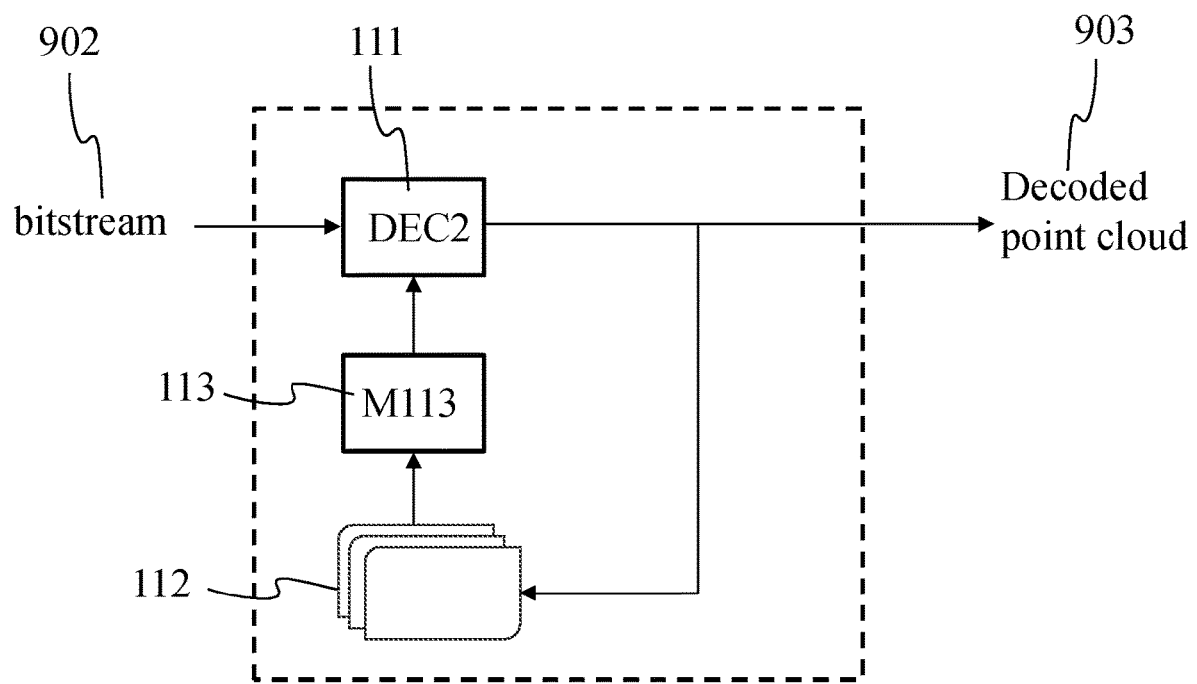
Figure 12:
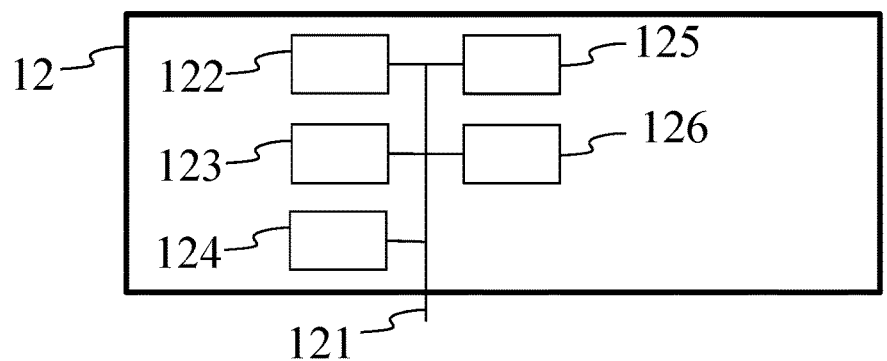
Figure 13:
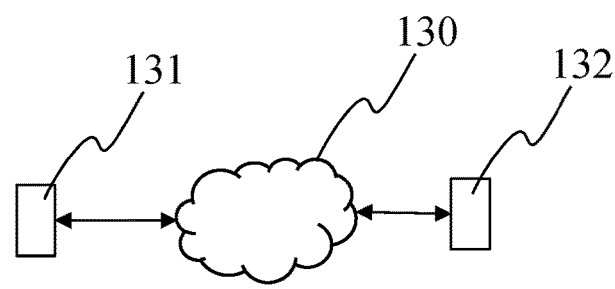
Figure 14:
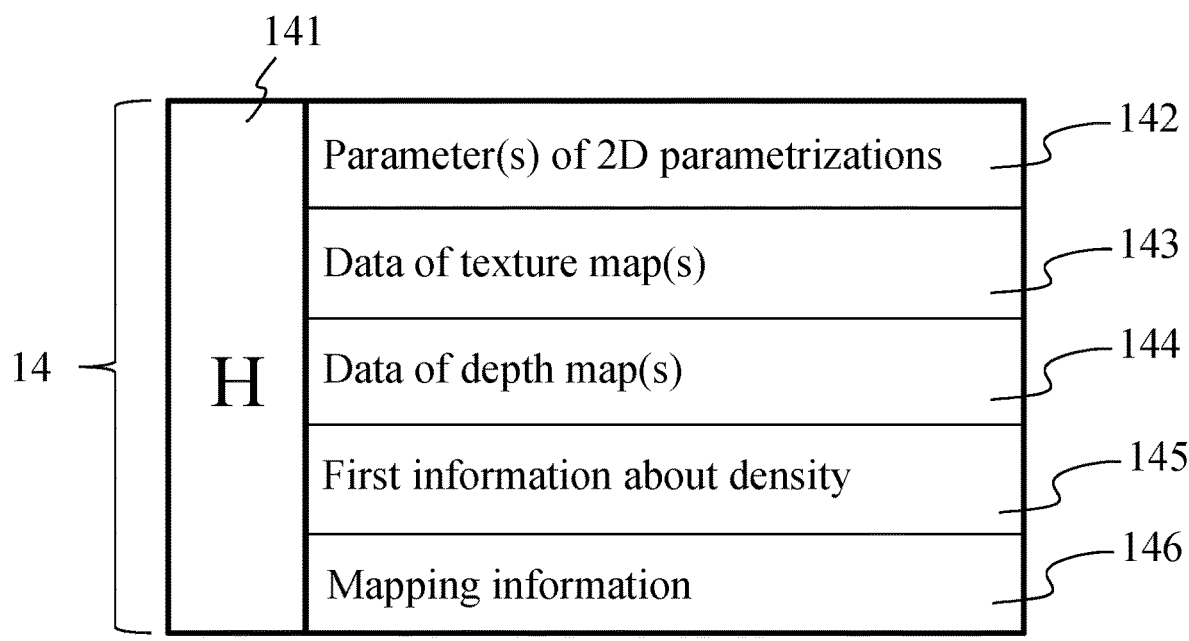
Figure 15:
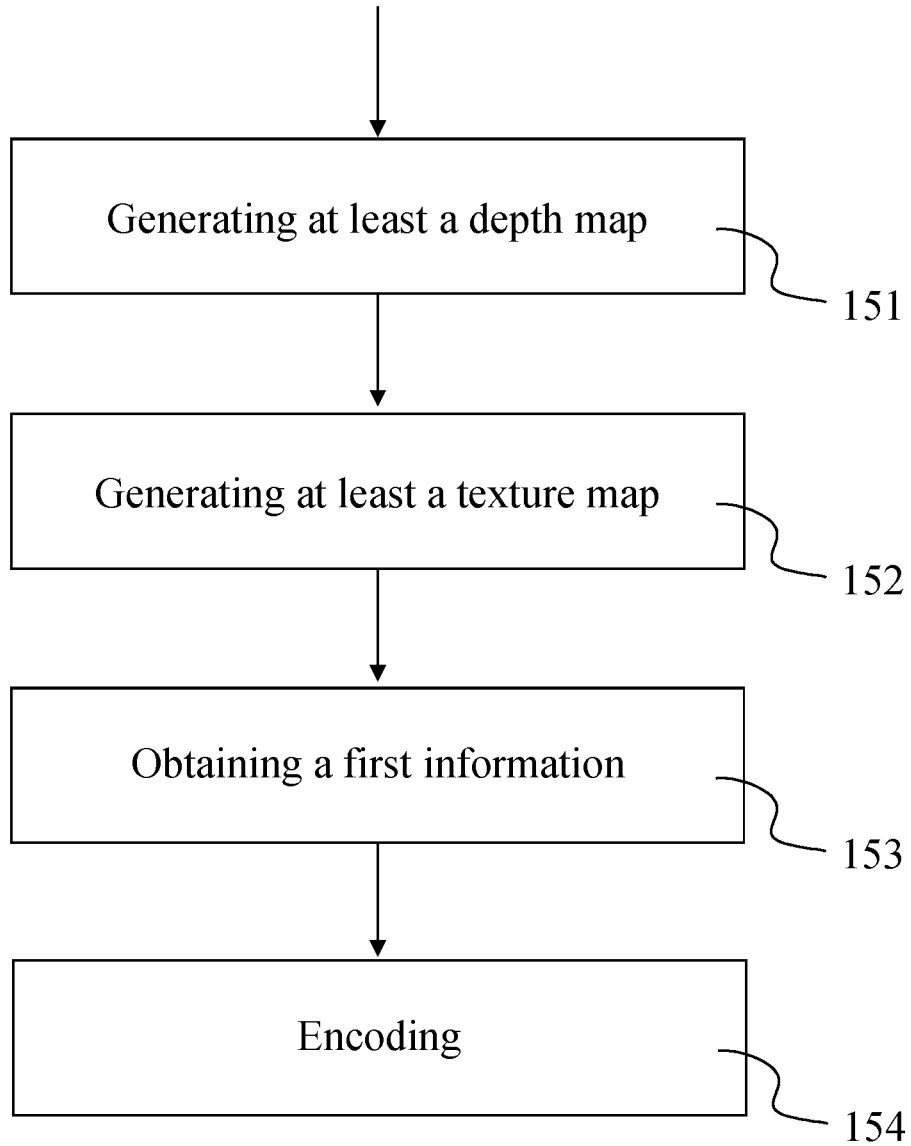
Figure 16:
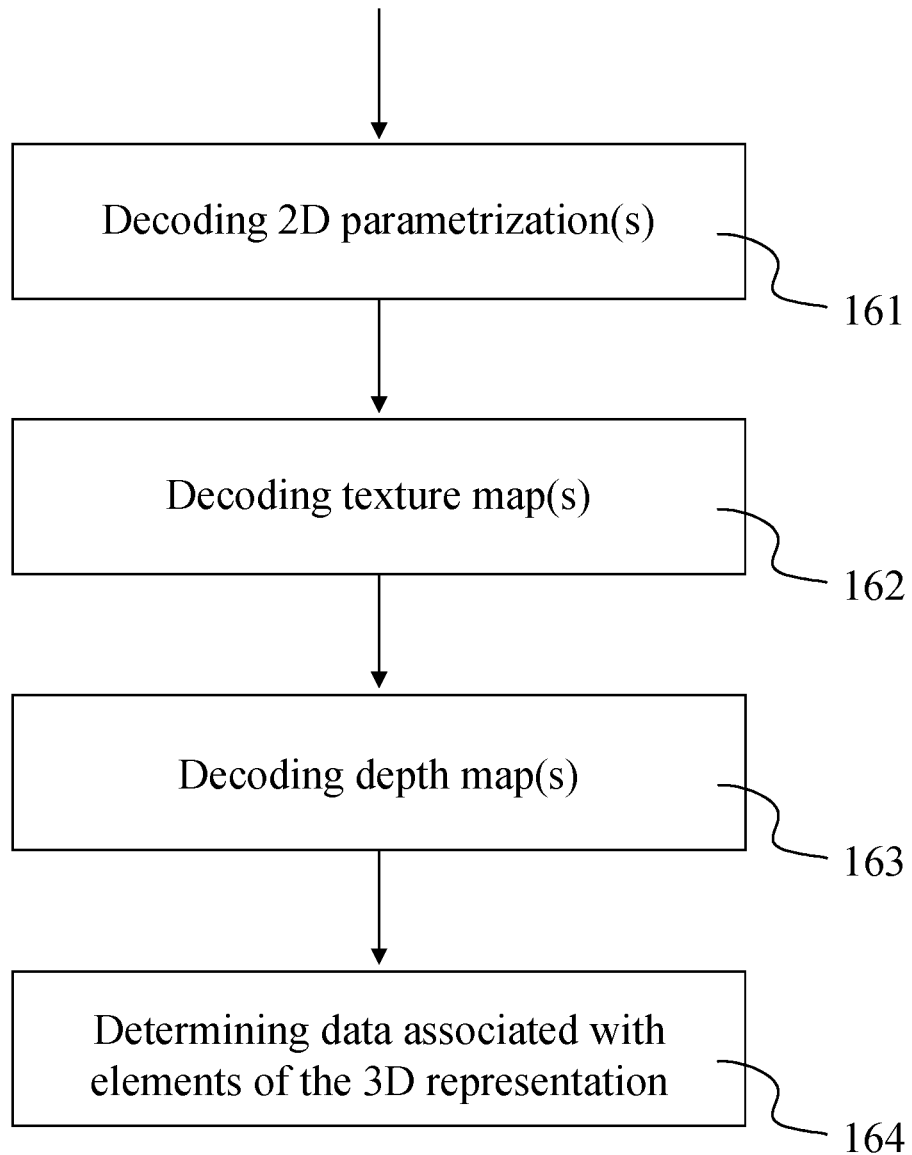

FIGS. 8A, 8B, 8C and 8D each shows a non-limiting example of the partitioning of the 3D representation of the 3D scene of FIG. 3;

FIG. 9 shows an example of an encoding/decoding scheme of the representation of the 3D scene of FIG. 3, in accordance with an example of the present principles;

FIG. 10 shows an example of a process implemented in the encoding of the representation of the 3D scene of FIG. 3, in accordance with a non-limiting embodiment of the present principles; and FIG. 11 shows an example of a process for decoding a bitstream to obtain the decoded 3D representation of the 3D scene of FIG. 3, in accordance with a non-limiting embodiment of the present principles;

FIG. 12 shows an example of an architecture of a device configured for implementing the method(s) of FIGS. 10, 11, 15 and/or 16, in accordance with an example of the present principles;

FIG. 13 shows two remote devices of FIG. 12 communicating over a communication network, in accordance with an example of the present principles;

FIG. 14 shows the syntax of a signal carrying a description of the 3D representation of the 3D scene of FIG. 3, in accordance with an example of the present principles;

FIG. 15 shows a method of encoding data representative of a 3D representation of the 3D scene of FIG. 3, in accordance with an example of the present principles;

FIG. 16 shows a method of decoding data representative of a 3D representation of the 3D scene of FIG. 3, in accordance with an example of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

According to non-limitative embodiments of the present disclosure, methods and devices to encode images of a volumetric video (also called 3DoF+ or 6DoF video) into a bitstream are disclosed. Methods and devices to decode images of a volumetric video from a bitstream are also disclosed. Examples of the syntax of a bitstream for the encoding of one or more images of a volumetric video are also disclosed.

According to a first aspect, the present principles will be described in reference to a first particular embodiment of a method of (and a device configured for) encoding data representative of a 3D representation of a scene (represented with an omnidirectional content, also called immersive video) into a bitstream. To reach that aim, one or more 2D parameterizations are obtained for the 3D representation, a 2D parameterization corresponding for example to a 2D pixel representation of the 3D representation or of a part of the 3D representation of the scene. A depth map (also called height map) and a texture map (also called color map) are determined for and associated with each part of the 3D representation using the one or more parameters describing the 2D parameterization associated with each part. The depth map associated with the 3D representation (or with a part of the 3D representation) comprises depth or distance information associated with the elements (e.g. points) comprised in the 3D representation (respectively in the part of the 3D representation). The texture map associated with the 3D representation (or with a part of the 3D representation) comprises texture information (e.g. RGB values) associated with the elements (e.g. points) comprised in the 3D representation (respectively in the part of the 3D representation). The density of the elements (e.g. points or vertices of mesh elements) of the 3D representation may spatially vary, i.e. the density of the elements (number of elements per volume unit) may be different from one 3D part/area of the 3D representation to another. A bitstream may be generated by combining and/or coding the parameters of the 2D parameterization(s), the data representative of the depth map(s), the data representative of the texture map(s), the information regarding the density or variation of density and mapping information that links each 2D parameterization with its associated depth map and texture map.

On the decoder/rendered side, the 3D representation (e.g. a point cloud or a mesh) may be reconstructed by decoding/extracting from the stream the parameters of the 2D parameterizations and associated depth and texture maps with the information related to the elements density/densities and one or more images of the 3D scene may be rendered from the 3D representation. For example, depending on the density level, a specific process may be applied to the area(s) of the 3D representation having an elements density below a determined level/value.

The use of a plurality of 2D parameterizations as references for representing the object with texture and depth information enables to reduce the amount of data needed for representing the scene in comparison to a representation with a point cloud or a 3D mesh while enabling to represent objects with complex topologies with an optimal level of details. Transmitting an information regarding the elements density enables to apply a specific process to some parts of the 3D representation (e.g. oversampling of the elements of the parts of 3D representation having a low elements density, i.e. below the determined level/value), which may be used to reduce the amount of data to be transmitted while enhancing the quality of representation of the reconstructed 3D scene.

Figure 1:
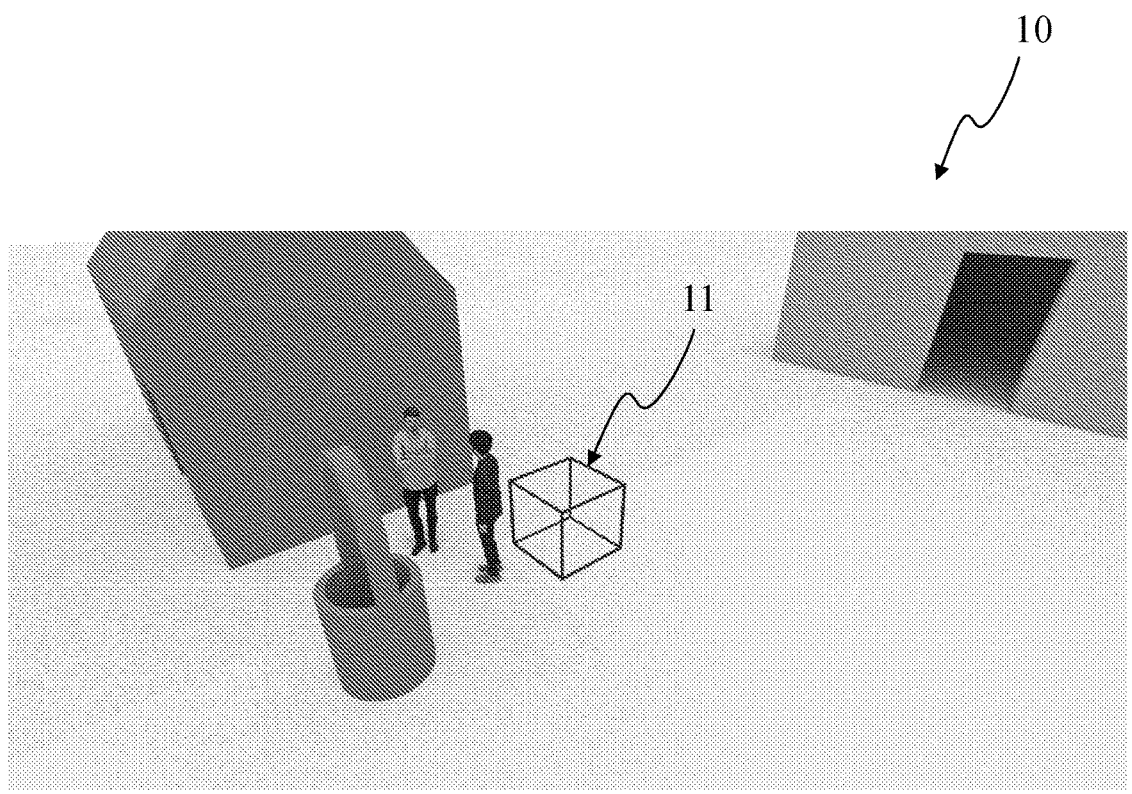
FIG. 1 shows a volumetric content, according to a particular embodiment of the present principles.

FIG. 1 shows an example of a volumetric content 10 (also called immersive content or omnidirectional content), according to a particular and non-limitative embodiment of the present principles. FIG. 1 shows an image representing a three-dimension scene comprising a surface representation of several objects. The scene may have been captured using any suitable technology. For example, it may have been created using computer graphics imagery (CGI) tools. It may have been captured by color image and depth image acquisition devices. In such a case, it is possible that part of the objects that are not visible from the acquisition devices (e.g. cameras) may not be represented in the scene. The example scene illustrated in FIG. 1 comprises houses, two characters and a well. Cube 11 on FIG. 1 illustrates a space of view from which a user is likely to observe the 3D scene from.

The display device used to visualize the volumetric content 10 is for example a HMD (Head-Mounted Display), worn on the head of a user or as part of a helmet. The HMD advantageously comprises one or more display screens (for example LCD (Liquid Crystal Display), OLED (Organic Light-Emitting Diode) or LCOS (Liquid Crystal on Silicon)) and sensor(s) configured for measuring the change(s) of position of the HMD, for example gyroscopes or an IMU (Inertial Measurement Unit), according to one, two or three axes of the real world (pitch, yaw and/or roll axis). The part of the volumetric content 10 corresponding to the measured position of the HMD is advantageously determined with a specific function establishing the relationship between the point of view associated with the HMD in the real world and the point of view of a virtual camera associated with the volumetric content 10. Controlling the part of the video content to be displayed on the display screen(s) of the HMD according to the measured position of the HMD enables a user wearing the HMD to browse into the immersive content, which is larger than the field of view associated with the display screen(s) of the HMD. For example, if the field of view offered by the HMD is equal to 110° (for example about the yaw axis) and if the immersive content offers a content of 180°, the user wearing the HMD may rotate his/her head to the right or to the left to see the parts of the video content outside the field of view offered by the HMD. According to another example, the immersive system is a CAVE (Cave Automatic Virtual Environment) system, wherein the immersive content is projected onto the walls of a room. The walls of the CAVE are for example made up of rear-projection screens or flat panel displays. The user may thus browse his/her gaze on the different walls of the room. The CAVE system is advantageously provided with cameras acquiring images of the user to determine by video processing of these images the gaze direction of the user. According to a variant, the gaze or the pose of the user is determined with a tracking system, for example an infrared tracking system, the user wearing infrared sensors. According to another variant, the immersive system is a tablet with a tactile display screen, the user browsing into the content by scrolling the content with one or more fingers sliding onto the tactile display screen.

The volumetric content 10 may for example be a $2\pi$, $2.5\pi$, $3\pi$ or $4\pi$ steradian content.

Figures 2A, 2B:
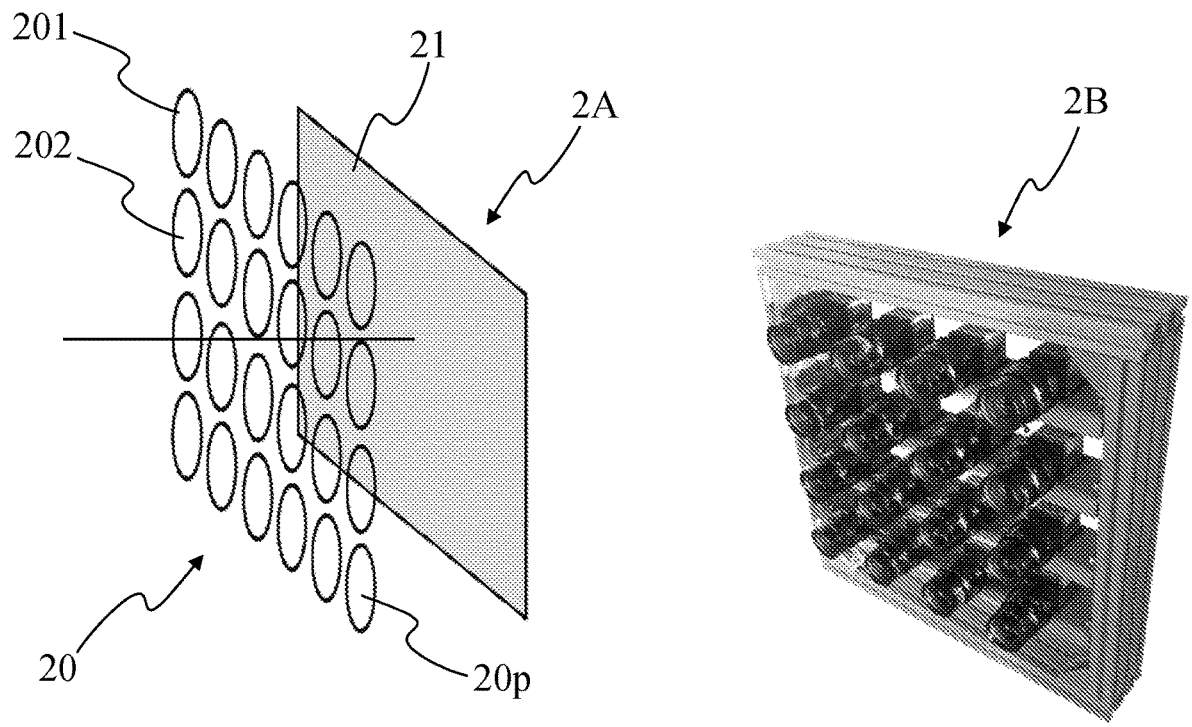
FIGS. 2A and 2B show a lightfield acquisition device configured to acquire images of a 3D scene [or of a part of the 3D scene] for obtaining at least a part of the volumetric content of FIG. 1, according to a particular embodiment of the present principles.

FIGS. 2A and 2B show an example of a lightfield acquisition device that may be used to acquire the volumetric content 10. More specifically, FIGS. 2A and 2B each show a camera array 2A, 2B (also called camera arrays), according to two particular embodiments of the present principles.

The camera array 2A comprises an array 20 of lenses or micro-lenses comprising several micro-lenses 201, 202 to 20$p$ with p being an integer corresponding to the number of micro-lenses, and one or several sensor arrays 21. The camera array 2A does not include a main lens. The array of lenses 20 may be a small device, which is commonly named a micro-lens array. The camera array with a single sensor can be considered as a special case of plenoptic camera where the main lens has an infinite focal length. According to a particular arrangement wherein the number of photosensors is equal to the number of micro-lenses, i.e. one photosensor is optically associated with one micro-lens, the camera array 20 may be seen as an arrangement of a plurality of individual cameras (for example micro-cameras) closely spaced, such as a square arrangement (as illustrated in FIG. 2A) or a quincunx arrangement for example, or non-flat arrangement for example on a cylindrical surface.

The camera array 2B corresponds to a rig of individual cameras each comprising a lens and a photosensor array. The cameras are spaced apart by, for example, a distance equal to a few centimetres or less or 5, 7 or 10 cm.

The lightfield data (forming a so-called lightfield image) obtained with such a camera array 2A or 2B corresponds to the plurality of views of the scene, i.e. to the final views that may be obtained by demultiplexing and demosaicing a raw image obtained with a plenoptic camera such as the plenoptic camera of the type 1.0, corresponding to a plenoptic camera wherein the distance between the lenslet array and the photosensor array is equal to the microlenses focal length, or of the type 2.0 otherwise (also called focused plenoptic camera). The cameras of the camera array 2B are calibrated according to any known method, i.e. intrinsic and extrinsic parameters of the cameras are known.

The different views obtained with the lightfield acquisition device enable to obtain an immersive content or at least a part of the immersive content with use of algorithms able to compute depth for example based on disparity. Naturally, the immersive content may be obtained with an acquisition device different from a lightfield acquisition device, for example with a camera associated with a depth sensor (e.g. an infra-red emitter/receiver such as the Kinect of Microsoft or with a laser emitter).

FIG. 3 shows two different representations of an object, or part of it, of the scene represented with the volumetric content 10. According to the example of FIG. 3, the object is a person, for example moving within the scene, and a part of the object corresponding to the head is illustrated in FIG. 3.

A first 3D representation 30 of the part of the object is a point cloud. The point cloud corresponds to a large collection of points representing the object, e.g. the external surface or the external shape of the object. A point cloud may be seen as a vector based structure, wherein each point has its coordinates (e.g. three-dimensional coordinates XYZ, or a depth/distance from a given point of view) and one or more attributes, also called component. An example of component is the color component that may be expressed in different color spaces, for example RGB (Red, Green and Blue) or YUV (Y being the luma component and UV two chrominance components). The point cloud is a representation of the object as seen from a given point of view, or a range of point of views. The point cloud may be obtained of different ways, e.g.:

from a capture of a real object shot by a rig of cameras, as the camera arrays of FIG. 2, optionally complemented by depth active sensing device;

from a capture of a virtual/synthetic object shot by a rig of virtual cameras in a modelling tool;

from a mix of both real and virtual objects.

According to a variant, the 3D representation corresponds to a 3D mesh representation and the points illustrated on the first representation corresponds to the vertices of the mesh elements (e.g. triangles) forming the mesh.

In the first case (from the capture of a real object), the set of cameras generates a set of images or sequences of images (videos) corresponding to the different views (different points of view). The depth information—meaning the distance from each camera center to the object surface—is obtained either by means of active depth sensing device, e.g., in infrared range and based on structured light analysis or time of flight, or based on disparity algorithms. In both cases, all cameras need to be calibrated, intrinsically and extrinsically. The disparity algorithms consist on a search of similar visual features on a pair of rectified camera images, typically to be made along a 1-dimension line: the larger the pixel column difference, the closer the surface of this feature. In the case of a camera array, the global depth information may be obtained from the combining of a plurality of peer disparity information, taking benefit of the plurality of camera pairs, therefore improving the signal over noise ratio.

In the second case (synthetic object), the modelling tool provides directly the depth information.

The density of the elements (e.g. points or mesh elements) forming the first 3D representation 30 may spatially vary. The number of elements per volume unit may differ from a volume unit to another, from a group of volume units to another of from a 3D part to another. A volume unit corresponds for example to a voxel or to a cube of determined dimensions (e.g. a cube with edges having each a size equal to 1, 2 or 10 cm for example). The density corresponds to the number of elements per volume unit, e.g. a number of points per voxel.

For example, by considering that images of the head of the person have been acquired with the camera array 2A and that the head was facing the camera array 2A during the acquisition of the images, the part(s) 301 of the head facing the camera array may be acquired with many cameras of the camera array 2A while other part(s) 302 may be acquired with few or less cameras than the part(s) 301. For example, the part(s) 301 may correspond to the areas of the object/scene having a normal essentially orthogonal to the plane formed by the cameras of the camera array 2A while the part(s) 302 may correspond to the areas of the object/scene having a normal essentially parallel to the plane formed by the cameras of the camera array 2A. Generating the 3D representation from the images acquired with the camera arrays leads to parts 301 with a number of elements used to represent them greater than the number of elements used to represent the parts 302. The density of elements of the part(s) 301 is greater than the density of elements of the part(s) 302, the part(s) 302 being seen from a reduced number of cameras in comparison to the part(s) 301.

Representing parts of the 3D scene with a low density of elements (i.e. with a density below a determined level/value) may generate issues when reconstructing the 3D representation of the 3D scene after coding/decoding of the data (e.g. texture and depth) representative of the 3D representation of the 3D scene, obtained as explained hereinabove.

Other issues may appear when browsing/navigating into the reconstructed 3D scene within the space of view proposed by the 3DoF+ representation of the scene. Indeed, a user may watch the reconstructed 3D scene according to a point of view that renders visible parts of the 3D representation of the 3D scene obtained with a limited number of elements, i.e. with a limited quality in terms of rendering.

A second representation 31 of the part of the object may be obtained from the point cloud (or the 3D mesh) representation 30, the second representation corresponding to a surface representation. The point cloud may be processed in order to compute its surface. For that purpose, for a given point of the point cloud, the neighboring points of this given point are used in order to compute the normal to the local surface at this given point, the surface element associated with this given point being derived from the normal. The process is reiterated for all points to obtain the surface. Methods for reconstructing the surface from a point cloud are for example described by Matthew Berger et al. in "State of the Art in Surface Reconstruction from Point Clouds", State of the Art Report, 2014. According to a variant, the surface element associated with a given point of the point cloud is obtained by applying splat rendering to this given point. The surface of the object (also called implicit surface or external surface of the object) is obtained by blending all the splats (e.g., ellipsoids) associated with the points of the point cloud.

In a particular embodiment, the point cloud represents only partial views of the object, and not the object in its totality, and this corresponds to the way how the object is supposed to be watched at the rendering side, for example in a cinematographic scene. For example, the shooting of a character facing a flat camera array generates a point cloud on the side of the rig only. The back of the character does not even exist, the object is not closed on itself, and the geometric characteristics of this object is therefore the set of all the surfaces oriented in the direction of the rig (the angle between the normal of each local surface and the ray back to the acquisition device is for example less than 90°).

Information regarding the density of the 3D representation of the 3D scene may further be obtained or determined. The density information may be obtained in a various way, knowing the geometry of the scene (e.g. the depth that may be determined from the different images acquired or obtained according to different points of view). For example, the density may be determined by counting for each element (or for each element of a part of the elements), e.g. point or mesh element, of the 3D representation the number of neighbors N, for example the number of neighbors in a sphere of radius R centered on said each element or in a cube centered on said each element. The density may be expressed with the number of neighbors N, as a surface density equal to the number of neighbors divided by the neighborhood surface (i.e. $N/(Pi \cdot R^2)$) or as a volume density equal to the number of neighbors divided by the neighborhood volume ($N/(4/3 \cdot Pi \cdot R^3)$).

According to another example, the density may be estimated by determining the distance to the nearest neighbor, for each element or for each element of a part of the elements of the 3D representation. This distance is considered as being equivalent to the above spherical neighborhood radius R (and N=1).

According to a further example, the 3D representation is partitioned in a plurality of parts (that may correspond to voxels or to elementary surface areas), for example as described with regard to FIGS. 8A to 8D) and the number of elements within each 3D part is calculated (e.g. from the geometry of the scene, for instance the depth associated with each element and for example determined from the images of the scene acquired for example from the camera array 2A).

According to another example, information about the density may be obtained by determining boundaries within the 3D representation. According to this example, the information representative of disparity may indicate which parts of the 3D representation have a density level below a determined level that may rise issues when reconstructing the 3D representation. Indeed, the areas of the 3D representation that have a low density of elements are located where boundaries (between objects of the scene and/or between parts of the object(s)) may appear in the images of the 3D scene used to generate the 3D representation. To reach that aim, one or more maps comprising information representative of the geometry of the scene, e.g. depth maps, are determined, for example from the lightfield data of the scene obtained with the camera array 2A or from depth sensors associated with the camera(s) used to acquire the images of the scene. A depth-based segmentation algorithm may then be performed to segment the scene according to the geometry information. An example of such a depth-based algorithm is for example described in "*Depth-Based Segmentation*", by E. François and B. Chupeau, IEEE Transactions on circuits and systems for video technology, vol. 7, No. 1, February 1997, which also describes a method for determining depth maps from stereoscopic images. Once the different parts of the scene have been segmented according to the depth, it is straightforward to detect the boundaries (i.e. the contours of the segmented parts of the scene) between the parts of the scene or between the objects of the scene. Naturally, the segmentation of the scene may be based on the color or texture of the images of the scene, such as described in "*Contour and Texture Analysis for Image Segmentation*", by J. Malik, S. Belongie, T. Leung and J. Shi, in International Journal of Computer Vision 43(1), 7-27, 2001.

According to another example, information about the density may be obtained by determining which part(s) or area(s) of the 3D scene have a normal vector essentially orthogonal (90°+/−5° for instance) with the normal to the plane of the acquisition device used to acquire images of the 3D scene. These areas correspond to areas of the scene acquired with a limited number of cameras and/or with acquired with a razing acquisition angle. According to this example, the density information provides information on the part(s)/area(s) of the scene having a density level below a determined level/value. The 3D representation of the scene may be partitioned in a plurality of areas and the normal vectors associated with these areas determined. The normal vectors may also be determined from the 2D parameterizations associated with the 3D parts of the 3D representation and obtained as explained with regard to FIG. 4.

Figure 4:
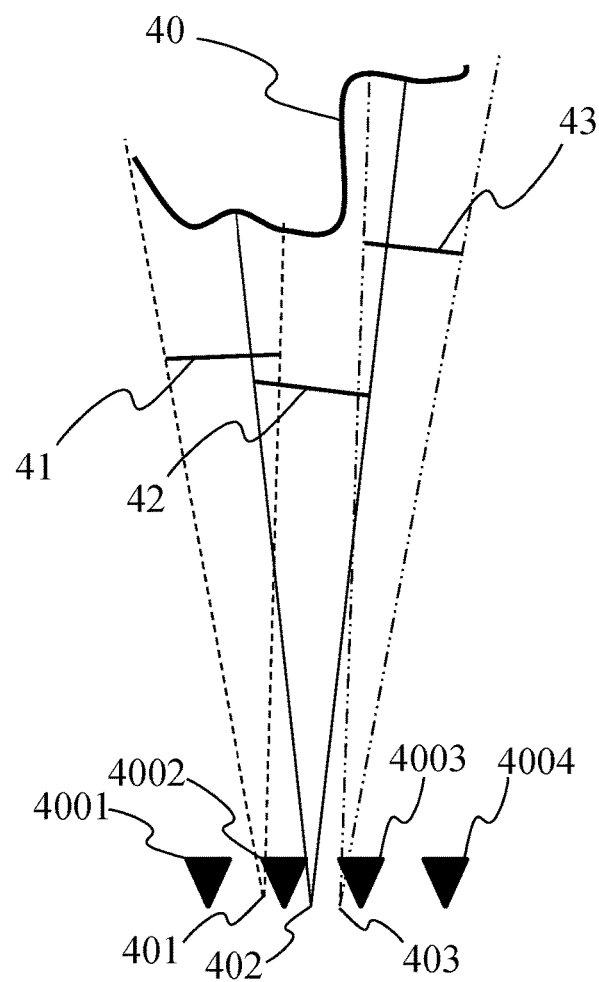
FIG. 4 shows 2D parameterizations associated with 3D parts of the representation of the 3D scene of FIG. 3, according to a particular embodiment of the present principles.

FIG. 4 shows 2D parameterizations 41, 42 and 43 associated with 3D parts of the representation 40 of the object of the scene that has been acquired with the cameras 4001, 4002, 4003 and 4004, according to a particular embodiment of the present principles. The cameras 4001 to 4004 correspond for example to some of the cameras of the rig of FIG. 2B. The object is represented with its surface 40 as in the example 31 of FIG. 3 but may be represented with the point cloud itself as in the example 30 of FIG. 3. Each 2D parameterization is associated with a 3D part of the representation of the object, each 3D part corresponding to a volume comprising one or more points of the point cloud. Each 2D parameterization is determined by taking into account pose information of the acquisition device in a way as to browse a maximum number of points (generated by the range of points of view of the acquisition device) of the point cloud comprised in the 3D part associated with said each 2D parameterization. When the 2D parameterization is obtained with a linear perspective projection of the points of the associated 3D part, a determined point of view is associated with each 2D parameterization, each point of view being comprised within a range of points of view that corresponds to the range of points of view used for acquiring the scene. The 2D parameterization 41 is associated with the point of view 401, the 2D parameterization 42 is associated with the point of view 402 and the 2D parameterization 43 is associated with the point of view 403. As can be seen on FIG. 4, each of the points of view 401 to 403 is located between the points of view 4001 and 4002 corresponding to respectively the left limit 4001 and the right limit 4004 of the range of points of view of the acquisition device. The point cloud is obtained from a limited and determined range of points of view and the 2D representations (i.e. the 2D parameterizations) of the 3D parts of the point cloud are all seen from a point of view that is located within the limited and determined range of points of view used to obtain the point cloud. Each 2D parameterization is a 2D representation of the 3D part of the point cloud it is associated with. A same 3D part may be represented with one or several 2D parameterizations, e.g. with 2, 3 or more 2D parameterization. As discussed hereinabove, a 2D parameterization associated with one given 3D part of the point cloud corresponds to a browsing in 2 dimensions of the given 3D part of the point cloud allowing to sample the given 3D part, i.e. a 2D representation of the content (i.e. the point(s)) of this given 3D part comprising a plurality of samples, the number of which depending from the sampling rate that is applied. A 2D parameterization may be obtained in diverse ways, for example by implementing any one of the following methods:

- linear perspective projection of the points of the 3D part of the point cloud onto a plane associated with a point of view, the parameters representative of the linear perspective projection comprising the location of the virtual camera, the spatial sampling rate and the field of view in the 2 dimensions;
- orthographic projection of the points of the 3D part of the point cloud onto a surface, the parameters representative of the orthographic projection comprising the geometry (shape, size and orientation) of the projecting surface and spatial sampling rate;
- LLE (Locally-Linear Embedding) that corresponds to a mathematical operation of dimension reduction, here applied to convert/transform from 3D to 2D, the parameters representative of the LLE comprising the transformation coefficients.

The 2D parameterizations 41, 42 and 43 may be represented with a limited number of parameters and defined for example with one or more parametric equations. The 2D parameterization associated with a given 3D part of the point cloud is determined by taking into account the geometric characteristic of the given 3D part (e.g. extreme points of the given 3D part and/or normal information associated with elements of the external surface of the part of the object comprised in the given 3D part that is obtained from the points located within the 3D part) and the pose information of the acquisition device(s) (e.g. for orienting the 2D parameterization). Considering the geometric characteristic of the 3D part and the pose information enables to obtain a 2D parameterization located in the space facing the 3D part, i.e. a 2D parameterization located between the acquisition devices and the point cloud.

As can be seen on FIG. 4, the 2D parameterizations 41, 42 and 43 may overlap each other, the overlapping being for example due to the overlapping of the 3D parts the 2D parameterizations are associated with.

Figure 8A:
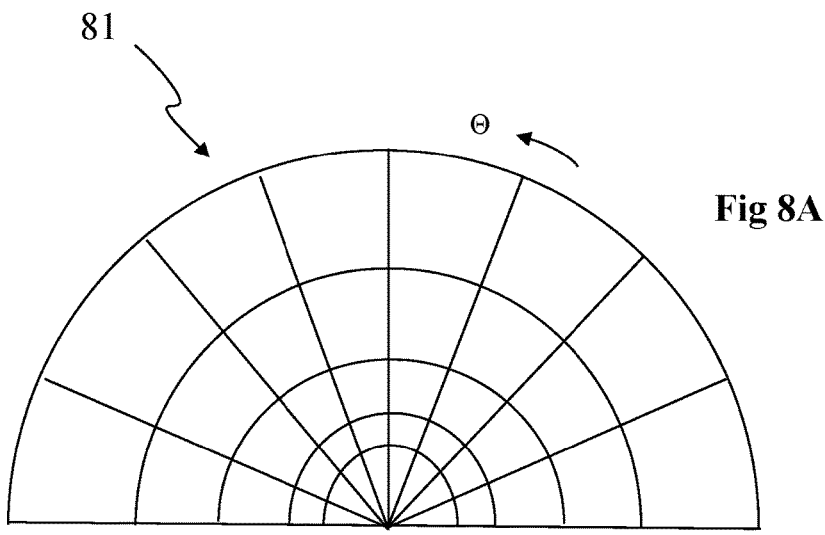
Figure 8B:
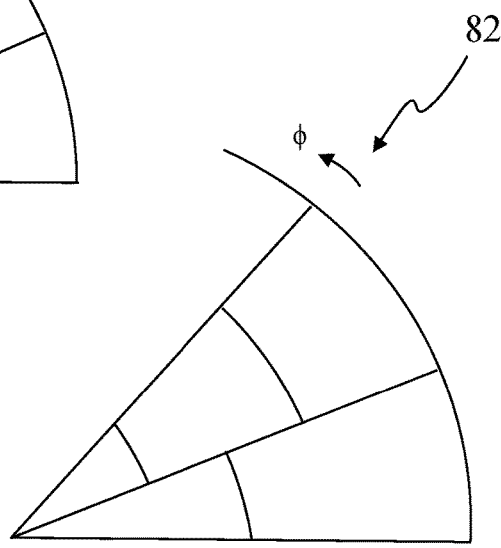
Figure 8C:
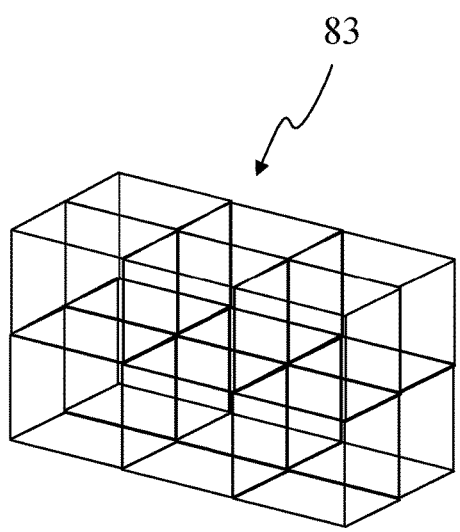
Figure 8D:
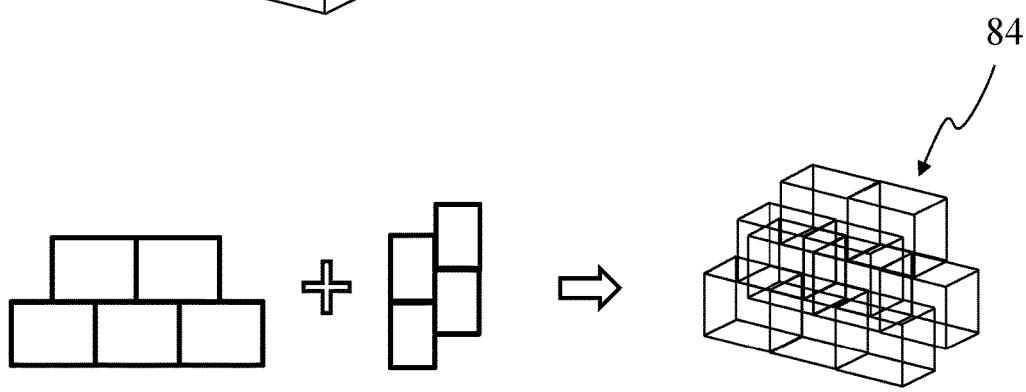

To obtain the 3D parts, the point cloud may be partitioned according to different methods. For example, the point cloud may be partitioned according to the examples of FIGS. 8A to 8D. According to the non-limiting example of FIG. 8A, the 3D space 81 (e.g. a half-sphere) occupied by the point cloud is partitioned according to spherical coordinates (r, θ, φ), i.e. according to a distance 'r' corresponding to the radius of the half-sphere and to the angles 'θ' and 'φ', each dimension 'r', 'θ' and 'φ' being partitioned evenly. According to a variant, one or more of the dimensions 'r', 'θ' and/or 'φ' may vary, for example the depth of the 3D parts may vary with the dimension 'r'. According to a variant, the size of each 3D part is determined to uniformly distribute the points of the point cloud into the 3D parts, the size of the 3D points depending from the local density of the points in the different areas of the space occupied by the point cloud. In the example of FIG. 8B, the 3D space 82 (e.g. a half-sphere) occupied by the point cloud is partitioned according to spherical coordinates (r, θ, φ) in a staggered way. In the examples of FIGS. 8A and 8B, the 3D parts may be seen as view camera frustum volumes. According to the non-limiting example of FIG. 8C, the 3D space 83 (e.g. a parallelepiped corresponding to a box bounding the point cloud) occupied by the point cloud is partitioned according to Cartesian coordinates (x, y, z), i.e. according to the 3 dimensions of a 3D Cartesian frame of reference. Each 3D part may have the form of a cube or of a rectangle parallelepiped. Each 3D part may have the same size, or the 3D parts may be of different size, for example to uniformly distribute the points into all 3D parts. FIG. 8D shows a variant of the partitioning of FIG. 8C wherein the parallelepipeds are distributed in a staggered way within the 3D space 84 occupied by the point cloud. Even if not illustrated on FIGS. 8A, 8B, 8C and 8D, the 3D parts resulting from the partitioning of the point cloud may overlap each other in part, meaning that some parts of the space of the point cloud may belong to several 3D parts. The partitioning of the point cloud may be fixed or may vary over the time. For example, the partitioning of the point cloud may vary from a GOP (Group of Pictures) to another GOP. When applied in the context of MPEG-DASH (Dynamic Adaptive Streaming over HTTP), the partitioning may vary from a segment to another segment, and in the frame of a ISOBMFF standard, this segment may be an ISOBMFF segment.

Figure 5:
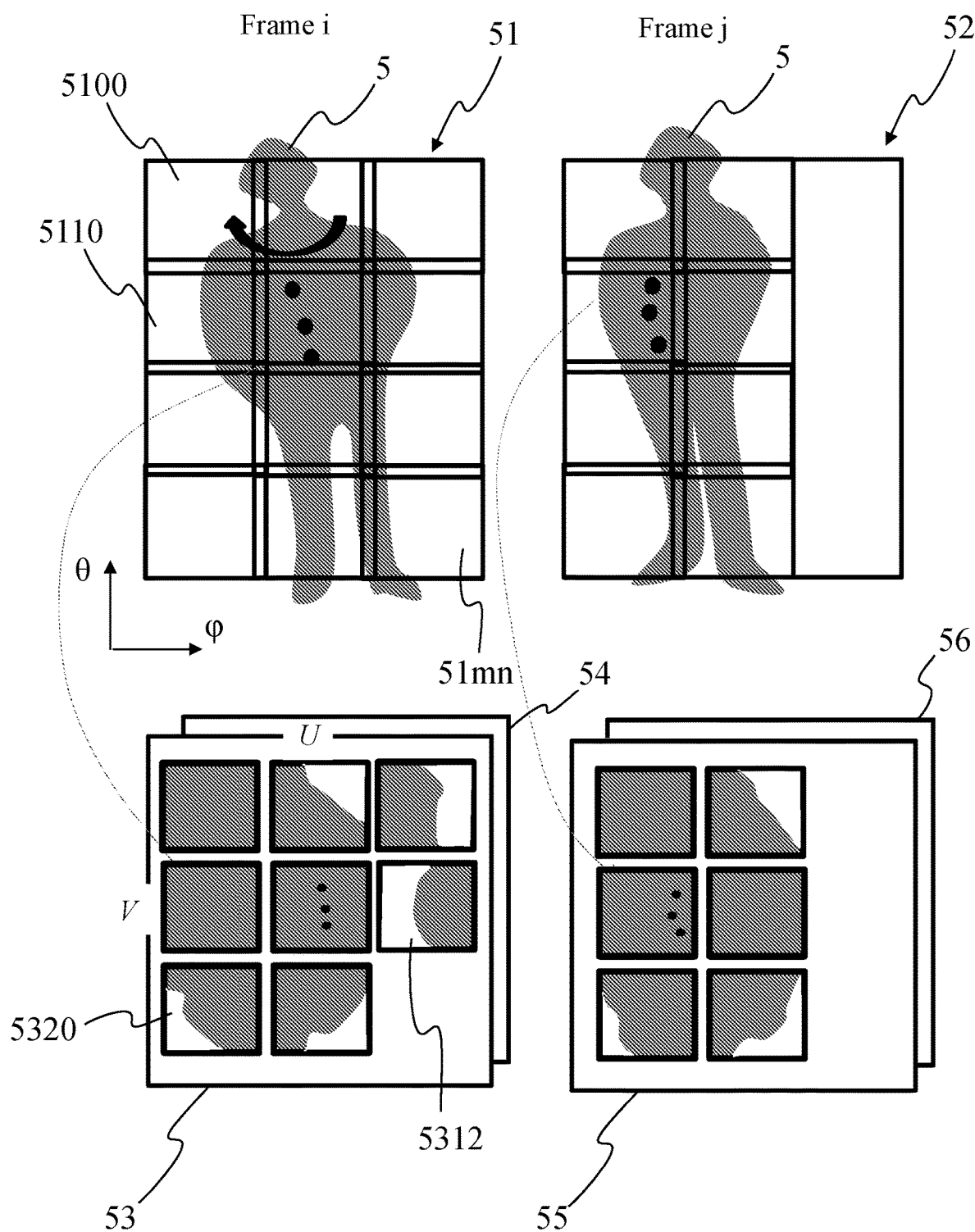
FIGS. 5 and 6 show patch atlas associated with the 3D parts of FIG. 4, according to particular embodiments of the present principles.

FIG. 5 shows the association of depth maps and texture maps with the 3D parts of the point cloud for a frame i and for a frame j located temporally after the frame i, according to a non-limiting example of the present principles. The 3D point cloud representing the object 5 (a person in the example of FIG. 5) is illustrated in shades of grey. The partitioning 51 of the object 5 corresponds to the example of FIG. 8A, i.e. a partitioning according to spherical coordinates, with partial overlap between neighboring 3D parts. For sake of clarity, the point cloud and its partitioning are represented in 2D, according to θ and φ only. The 3D parts resulting from the partitioning are illustrated with squares 5100, 5110, 51mn arranged in a matrix fashion, wherein 'm' corresponds to the row index and 'n' corresponds to the column index. For example, the reference number 5100 points to the square belonging to the row with index '0' and to the column with index '1' and the reference number 5110 points to the square belonging to the row with index '1' and to the column with index '0'. One depth map is associated with each 3D part of the point cloud 5. In a same way, one texture map is associated with each 3D part of the point cloud 5.

A density information may be associated with each depth map and/or each texture map. The density information may for example take the form of metadata associated with each depth map. The density information may for example be representative of the average elements density of the 3D part associated with each depth map (or texture map). According to another example, the density information may for example be representative of a range of density values that represents the range of density values in the considered 3D part. According to a further example, the density information may correspond to a flag associated with each depth map indicating whether the density of the elements comprised in the associated 3D parts is below a determined density level/value (e.g. the flag may be equal to 0 when the density is greater than the determined value and 1 when the density is less than the determined value, or the other way around).

A depth map associated with a given 3D part, for example the 3D part 5110, is obtained by using the parameters of the 2D parameterization associated with the given 3D part 5110 and the depth map 5320 is obtained by using the parameters of the 2D parameterization associated with the 3D part 5320. For example, when the 2D parameterization corresponds to a linear perspective projection, the parameters representative of the 2D parameterization are the location of the point of view (i.e. the virtual camera location) (that may be for example obtained from the normal associated with the points of the point cloud comprised in the 3D part) and the horizontal and vertical field of view. Depth information to be stored in the depth map corresponds to the distances between the virtual camera location in the case of linear perspective or the 2D projection surface in the case of orthographic projection and the points of the point cloud comprised in the 3D part along rays starting from the point of view in the case of linear perspective or orthogonal to the projection surface in the case of orthographic projection and ending at the points of the point cloud comprised in the 3D part, knowing the coordinates of the points and the coordinates of the point of view (in the case of a linear perspective projection) in world space for example. When the object is represented with its implicit surface obtained from the points of the point cloud, the distances to be stored in the depth map correspond to the distances between the intersections between the rays and the 2D parameterization surface on one hand and the intersections between the rays and the implicit surface on the other hand. The number of depth information may depend on the resolution of the 2D parameterization surface that depends from the sampling interval. A depth map is for example obtained by applying the splat rendering technique, i.e. the depth value associated with a point is assigned to the sample of the 2D parameterization surface associated with this point (this sample depending from the type of 2D parameterization that is used, e.g., linear perspective projection, orthographic projection or LLE) and also to the samples located in the neighborhood of the crossed sample (these samples forming a splat). According to a variant, the depth map is obtained by applying ray tracing technique, i.e. by launching rays from the samples of the 2D parameterization surface and by assigning to a given sample the depth value that corresponds to the depth value associated with the point that is intersected by the ray launched from this given sample (or the point the closest to the ray).

The coding of depth information may vary from a depth map to another one in the first patch atlas 53. For example, the coding of depth information for a given depth map may be adapted to the range of depth values for the 3D part associated with the given depth map and/or to the number of points comprised in the 3D part. For example, depending on the minimal depth value and maximal depth value computed for the 3D part, the coding of the depth information in the corresponding depth map is determined to be adapted to the difference between these minimal and maximal values. If the difference is small, the depth information may for example be coded on 8 or 10 bits and if the difference is great, the depth information may for example be coded on 12, 14 or more bits. Varying the coding from a depth map to another one enables to optimize the bit rate coding. According to a variant, the depth information is coded on a same bit depth (e.g. 8, 10, 12 or 14 bits) for each 3D map, whatever the difference between the minimal and maximal depth value, but by considering the minimal and maximal values. Such a variant enables decreasing the quantization step when the difference is small which enables to decrease the quantization noise associated with the coding of the depth information.

In a same way, a texture map associated with the given 3D part is obtained by using the parameters of the 2D parameterization associated with the given 3D part. Color information retrieved from the points of the point cloud comprised in the given 3D part or color information retrieved from the implicit surface of the object intersected by the rays casted from the point of view is associated with the samples of the 2D parameterization surface to form the color map. As for the depth maps, a color map is for example obtained by applying the splat rendering technique, i.e. the color value(s) associated with a point is assigned to the sample of the 2D parameterization surface associated with this point (this sample depending from the type of 2D parameterization that is used, e.g., linear perspective projection, orthographic projection or LLE) and also to the samples located in the neighborhood of the crossed sample (these samples forming a splat). According to a variant, the texture map is obtained by applying ray tracing technique, i.e. by launching rays from the samples of the 2D parameterization surface and by assigning to a given sample the color value that corresponds to the color value associated with the point that is intersected by the ray launched from this given sample (or the point the closest to the ray). As for the depth information, the coding of color information for a given color map may be adapted to the range of color values for the 3D part associated with the given color map and/or to the number of points comprised in the 3D part. For example, depending on the minimal color value and maximal color value computed for the 3D part, the coding of the color information in the corresponding color map is determined to be adapted to the difference between these minimal and maximal values. If the difference is small, the texture/color information may for example be coded on 8 or 10 bits and if the difference is great, the texture/color information may for example be coded on 12, 14 or more bits. Varying the coding from a color map to another one enables to optimize the bit rate coding. According to a variant, the color information is coded on a same bit depth (e.g. 8, 10, 12 or 14 bits) for each texture map, whatever the difference between the minimal and maximal color value, but by considering the minimal and maximal values. Such a variant enables to decrease the quantization step when the difference is small which enables to a higher color dynamic range or higher luminance range, which may be used to obtain a HDR (High Dynamic Range) representation of the object represented with the point cloud.

The set of obtained depth maps may be arranged in a first patch atlas 53 according to a determined or random arrangement, for example in a matrix fashion with rows and columns, wherein a patch of the first patch atlas 53 corresponds to one depth map. For example, the patch 531 is the depth map associated with the 3D part 5110.

In a same way, the set of obtained texture maps are arranged in a second patch atlas 54, for example according to a same arrangement as the depth maps in the first patch atlas 53.

One or more additional patches may be added to the first patch atlas 53 and/or the second patch atlas. The additional patch(es) may be used to embed the density information, pixels of the additional patch(es) comprising density information on the other patches of the first and/or second patch atlas. A mapping information may be associated with the additional patch(es) to indicate the association between pixels of the additional patch(es) and associated patches of the first and/or second patch atlas. For example, one pixel of the additional patch may be associated with one depth map and may transport the density information associated with this depth map.

A first mapping information may be generated to keep the connection between a 2D parameterization and the associated depth map and texture map in respectively the first and second patch atlas. The first mapping information may for example be of the form of:

{parameters of the 2D parameterization; depth map ID; texture map ID} wherein the depth map ID may be an integer value or a pair of values comprising the column index U and the row index V the depth map belongs to in the matrix of patches of the first patch atlas; the texture map ID may be an integer value or a pair of values comprising the column index U' and the row index V' the texture map belongs to in the matrix of patches of the second patch atlas.

When the depth maps and the texture maps are arranged according to a same arrangement in the first patch atlas and the second patch atlas, the depth map ID and the texture map ID are the same and the first mapping information may be for example of the form of:

{parameters of the 2D parameterization; depth and texture maps ID} wherein 'depth and texture maps ID' identifies both depth map in the first patch atlas and the color map in the second map atlas, either via a same integer value associated with both depth and texture maps or via the pair of values column index U and row index V the depth and texture maps belong in respectively the first patch atlas and the second patch atlas.

The same mapping information is generated for each 2D parameterization and associated depth and texture maps. Such a first mapping information enables to reconstruct the point cloud by establishing the association of the 2D parameterization with corresponding depth and texture maps. If the 2D parameterization is a projection, the point cloud may be reconstructed by de-projecting (performing the inverse projection) the depth information comprised in the associated depth map and the texture/color information in the associated texture map. The first mapping information then corresponds to a list of mapping information:

{parameters of the 2D parameterization; depth and texture maps ID}$_i$,

For i=1 to n, with n the number of 2D parameterizations.

The first patch atlas 53 and the second patch atlas may be seen as images with same resolution, i.e. with a same number of pixels arranged in a matrix fashion with K columns and L rows, K and L being integer. Each patch (corresponding to either a depth map for the first patch atlas 53 or to a texture map for the second patch atlas 54) comprises a subset of pixels of the image representing either the first patch atlas 53 or the second patch atlas.

According to an optional variant, a second mapping information may be associated with the pixels of the images representing either the first patch atlas 53 or the second patch atlas 54, the second mapping information being advantageously common to the image representing the first patch atlas 53 and to the image representing the second patch atlas 54, the resolution being the same for both images and the patches referring to a same 2D parameterization being organized according to a same arrangement in both first and second patch atlas. The second mapping information indicates to which 2D parameterization each pixel or each group of pixels of the image representing the first patch atlas (or the second patch atlas) refers to or is associated with. To reach that aim, an identification information is associated with each 2D parameterization (for example an integer value different for each 2D parameterization). The second mapping information may for example be of the form a map of cells arranged in rows and columns, each cell corresponding to a pixel or to a group of pixels of the image and comprising the identification information of the corresponding 2D parameterization. According to another example, the second mapping information corresponds to a list, for example of the following form:

{3D part Identification, pixel/group of pixels identification}, for each pixel or each group of pixels of the image representing the first/second patch atlas. The second mapping information enables to speed up the decoding of the information at decoder/rendered side by easing the retrieving of the identification information associated with each 3D part, which should occur for each pixel of the image. Typical implementation of the decoder requires the parallel implementation of this retrieving for each pixel of the image on a GPU (Graphical Processing Unit) which has to avoid browsing a list. According to this optional variant, this second mapping information is an image typically with lower resolution than the color and depth image where each pixel gives directly the identification information associated with each 3D part the pixel/point belongs to.

The partitioning of the object 5 may vary over time, for example from a GOP to another following GOP, or when a change in the topology of the object 5 has been changed or every q frames, with q an integer greater than or equal to 1. Such a variation in the partitioning is illustrated in FIG. 5 with the frame j. The partitioning 52 of the object 5 at frame j is different from the partitioning 51 of the same object 5 at frame i. In the example of FIG. 5, the topology of the object 5 at frame j is different from the topology of the object 5 at frame i. Frame j may for example belongs to a GOP that temporally follows the GOP comprising the frame i. A first patch atlas 55, comprising depth maps associated with the 3D parts and corresponding 2D parameterizations, is obtained using the parameters representative of the 2D parameterizations associated with the 3D parts resulting from the partitioning and from the data representative of the geometry (e.g. coordinates) of the points comprised in the 3D parts, as described with regard to frame i. As the number of 3D parts resulting from the partitioning 52 is less than the number of 3D parts resulting from the partitioning 51, the number of depth maps in the first patch atlas 55 is less than the number of depth maps comprised in the first patch atlas 53. In a same way, a second patch atlas 56, comprising texture maps associated with the 3D parts and corresponding 2D parameterizations, is obtained using the parameters representative of the 2D parameterizations associated with the 3D parts resulting from the partitioning 52 and from the data representative of the geometry (e.g. coordinates) of the points comprised in the 3D parts, as described with regard to frame i. As the number of 3D parts resulting from the partitioning 52 is less than the number of 3D parts resulting from the partitioning 51, the number of texture maps in the second patch atlas 56 is less than the number of depth maps comprised in the second patch atlas 54.

Figure 6:
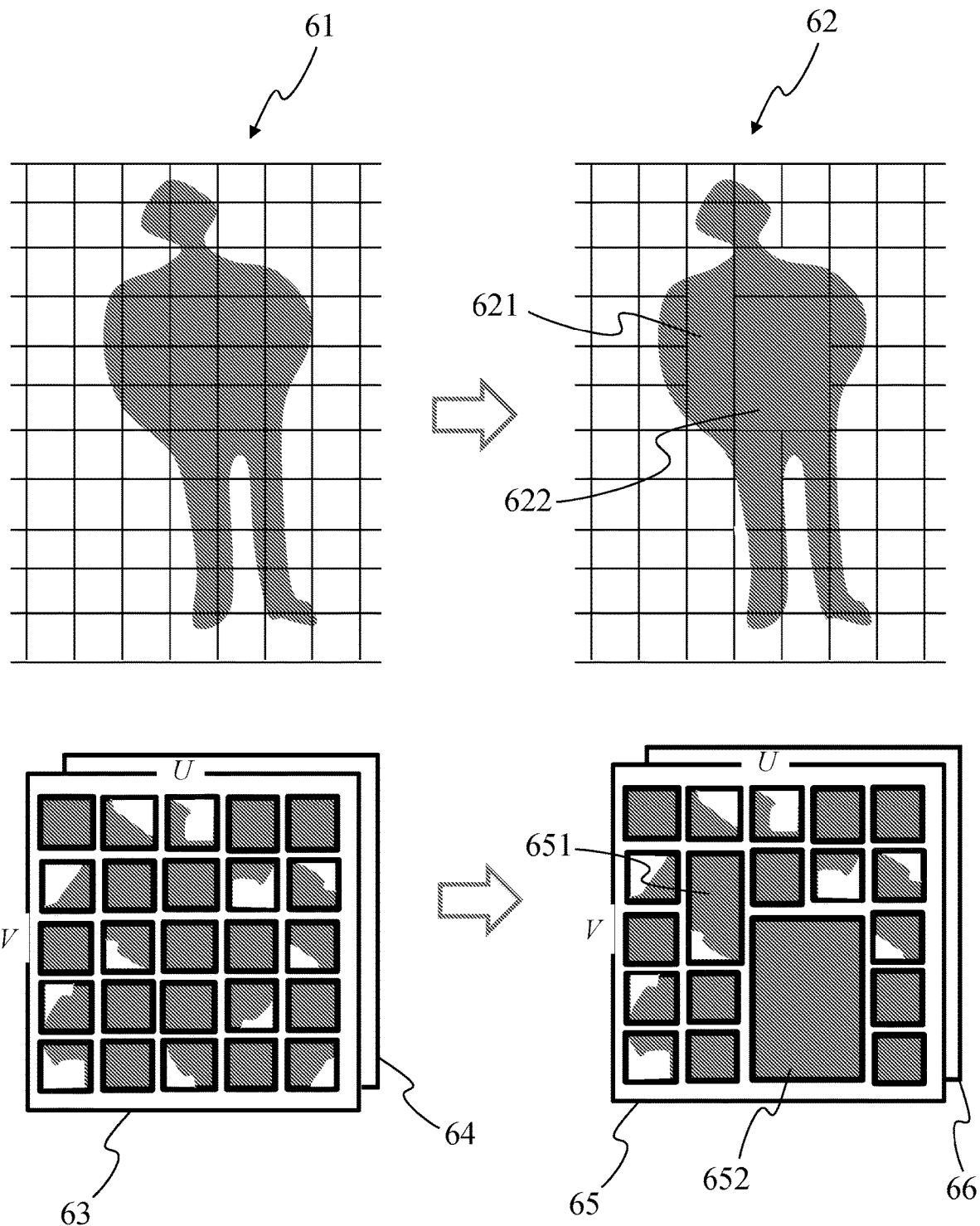

FIG. 6 shows further non-limiting examples of first or second patch atlas associated with 3D parts of the 3D representation (e.g. the point cloud) representing the object 5. FIG. 6 shows a first partitioning 61 of the point cloud corresponding for example to the partitioning 51 of FIG. 5 and a second partitioning 62 of the same point cloud. A first patch atlas 63 is generated from the first partitioning 61, the first patch atlas 63 comprising the depth maps obtained from the 2D parameterizations associated with the 3D parts resulting from the partitioning 61. A second patch atlas 64 is generated from the first partitioning 61, the second patch atlas 64 comprising the texture maps obtained from the 2D parameterizations associated with the 3D parts resulting from the partitioning 61.

The second partitioning 62 is different from the first partitioning 61 in the sense that some of the 3D parts of the first partitioning 61 have been grouped into a single 3D part of the second partitioning 62. For example, 6 3D parts of the first partitioning 61 representing the torso of the person have been grouped to form one 3D part 622 in the second partitioning 62. In a same way, 4 3D parts of the first partitioning 61 representing part of the shoulder and arm of the person have been grouped to form one 3D part 621 in the second partitioning 62. The 3D parts are for example grouped according to the geometrical characteristics associated with the points of the point cloud comprised in the 3D parts. For example, 3D parts may be grouped together when the implicit surface obtained from the points comprised in each of these 3D parts have a similar topology, e.g. normal close to each other and/or range of associated depth value close to each other.

A first patch atlas 65 is generated from the second partitioning 62, the first patch atlas 65 comprising the depth maps obtained from the 2D parameterizations associated with the 3D parts resulting from the second partitioning 62. As illustrated on FIG. 6, the shape and number of depth maps in the first patch atlas 65 is different from the shape and number of depth maps in the first patch atlas 63. Some of the depth maps 651, 652 associated with the 2D parameterizations of the 3D parts 621, 622 are different in size in comparison to the corresponding depth maps in the first patch atlas 63. In a same way, a second patch atlas 66 is generated from the second partitioning 62, the second patch atlas 66 comprising the texture maps obtained from the 2D parameterizations associated with the 3D parts resulting from the second partitioning 62. The number of color maps in the second patch atlas 66 is less than the number of color maps in the second patch atlas 64 following the grouping of 3D parts of the first partitioning 61 to obtain the second partitioning 62. This grouping allows to reduce the number of patches, and therefore the number of sharp frontiers and high spatial frequency information. Reducing this lowers the compression bit rate of the texture and depth maps.

According to a further example, a single 2D parameterization may be associated with the whole object 5, a single depth map and a single texture map may be generated for the whole object 5.

Figure 7:
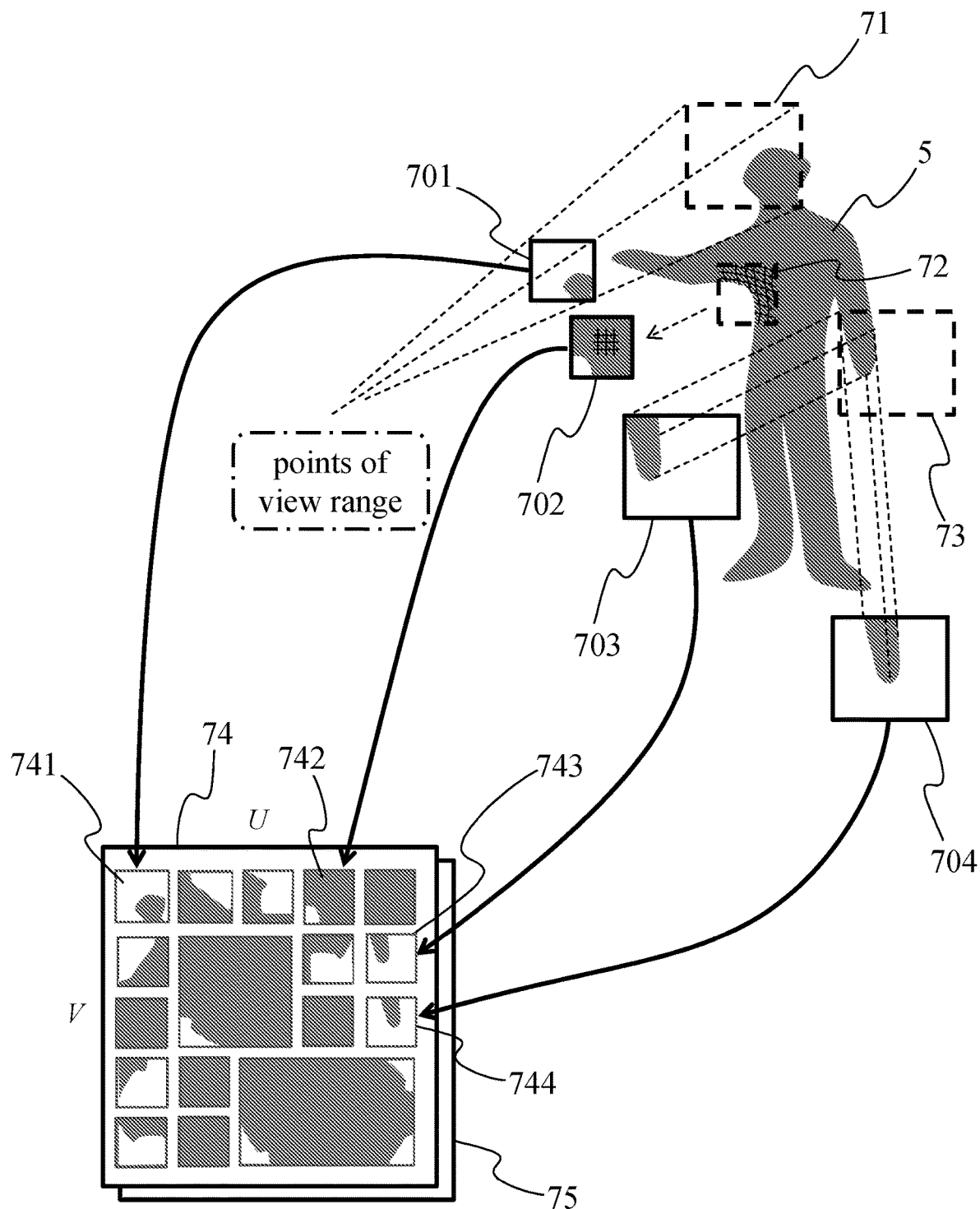
FIG. 7 shows the generation of the patch atlas of FIGS. 5 and 6, according to a non-limiting embodiment of the present principles.

FIG. 7 illustrates the generation of first and second patch atlas from 3D parts of a point cloud representing the object 5, according to a non-limiting example of the present principles.

The point cloud representing the object 5 is partitioned into a plurality of 3D parts, e.g. 50, 100, 1000 or more 3D parts, 3 of them being illustrated on FIG. 7, i.e. the 3D parts 71, 72 and 73, the 3D part 71 comprising points of the point cloud representing part of the head of the person, the 3D part 72 comprising points of the point cloud representing an armpit of the person and the 3D part 73 comprising points of the point cloud representing a hand of the person. One or more 2D parameterizations of each 3D part or of a part of the 3D parts are generated to represent each 3D part in two dimensions. For example, a 2D parameterization 701 is obtained for the 3D part 71, a 2D parameterization 702 is obtained for the 3D part 72 and 2 different 2D parameterizations 703 and 704 are obtained for the 3D part 73. The 2D parameterization may vary from a 3D part to another one. For example, the 2D parameterization 701 associated with the 3D part 71 is a linear perspective projection while the 2D parameterization 702 associated with the 3D part 72 is a LLE and the 2D parameterizations 703 and 704 associated with the 3D part 73 are both orthographic projections according to different points of view. All point of views used to obtain the 2D parameterizations are chosen to be located within the range of points of view of the acquisition device used to obtain the images of the object 5 and to obtain the associated point cloud. According to a variant, all 2D parameterizations associated with all 3D parts are of the same type, e.g. a linear perspective projection or an orthographic projection. According to a variant, different 2D parameterizations may be used for a same 3D part. A first patch atlas 74 collecting the depth maps associated with the obtained 2D parameterizations is generated as explained with regard to FIGS. 5 and 6. The first patch atlas comprises a depth map 741 associated with the 2D parameterization 701, a depth map 742 associated with the 2D parameterization 702, a depth map 743 associated with the 2D parameterization 703 and a depth map 744 associated with the 2D parameterization 704, among other depth maps. A second patch atlas 75 collecting the texture maps associated with the obtained 2D parameterizations is generated as explained with regard to FIGS. 5 and 6.

The choice of 2D parameterization for each 3D part is for example based on an optimization process, for example to reduce the number of maps in the first and second patch atlas, and/or to minimize the points of the 3D part which would be lost during the 3D to 2D transformation process.

Each depth or texture map has advantageously a rectangular shape to ease the packing process on the first patch atlas and the second patch atlas.

The depth maps and texture maps in respectively the first patch atlas and the second patch atlas will be separated by a border which will be discarded at the decoder side, to get rid of compression artefacts occurring at sharp visual frontiers. The exact part of information to retrieve for the depth and texture maps at decoder side for the regeneration of the point cloud, e.g. the depth/texture map's width and height, is provided by some of the 2D parameterization parameters, like for example the parameters giving the span in 2 dimensions of the projection surface expressed in pixel in the case of linear or orthographic perspective projection.

FIG. 9 shows schematically a diagram of an encoding/decoding scheme of a 3D scene, e.g. a 3D representation of the scene such as a point cloud, according to a particular and non-limiting embodiment of the present principles.

The point cloud 901 is encoded into encoded data under the form of a bitstream 902 via an encoding process 91 implemented in a module M91. The bitstream is transmitted to a module M92 that implements a decoding process 92 to decode the encoded data to obtain a decoded point cloud 903. The modules M91 and M92 may be hardware, software or a combination of hardware and software.

The point cloud 901 may be a dynamic point cloud that evolves with the time, i.e. the number of points may vary with the time and/or the location (e.g. at least one of the coordinates X, Y and Z) of one or more points may vary with the time. The evolution of the point cloud may correspond to the motion of the object represented by the point cloud and/or to any change of shape of the object or part(s) of the object.

The point cloud 901 may be represented in a picture or in one or more groups of temporally successive pictures, each picture comprising a representation of the point cloud at a determined time 't'. The one or more groups of temporally successive pictures may form a video representative of at least a part of the point cloud 901.

The encoding process 91 may for example implement intra-picture coding and/or inter-picture coding. Intra-picture coding is based on intra-picture prediction that exploits spatial redundancy, i.e. correlation among pixels within one picture, by calculating prediction values through extrapolation from already coded pixels for effective delta coding. Inter-picture coding is based on inter-picture prediction that exploits temporal redundancy. Temporally independently coded so-called intra pictures 'I' use only intra coding. The temporally coded predicted pictures 'P' (or 'B') may use intra- and inter-picture prediction.

The decoding process 92 may for example correspond to the inverse operations of the encoding process 91 to decode the data encoded with the encoding process.

FIG. 10 shows operations for encoding the 3D scene or its 3D representation, e.g. the point cloud 901, according to a particular and non-limiting embodiment of the present principles. The operations may be part of the encoding process 91 and may be implemented by the apparatus 12 of FIG. 12.

In an operation 101, data of a picture 100 (corresponding for example to a first or a second patch atlas) of the point cloud 901 is encoded by an encoder ENC1. The picture is for example part of a group of pictures (GOP) and comprises data representative of the point cloud at a determined time 't'. The picture may comprise a set of images, each image corresponding to a patch (i.e. a depth map or a texture map), each comprising attributes, e.g. depth and/or texture attributes. The attributes may be obtained by projecting, according to a determined 2D parameterization, a part of the point cloud in each image, the attributes corresponding to the attributes of the points of the part of the point cloud projected onto said each image. The attributes may correspond to texture (or color) information and/or depth (or distance to a view point) information. The encoder ENC1 is for example compliant with a legacy encoder such as:

- JPEG, specification ISO/CEI 10918-1 UIT-T Recommendation T.81, https://www.itu.int/rec/T-REC-T.81/en,
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en,
- HEVC (its specification is found at the ITU website, T recommendation, H series, h265, http://www.itu.int/rec/T-REC-H.265-201612-I/en), or 3D-HEVC (an extension of HEVC whose specification is found at the ITU website, T recommendation, H series, h265, http://www.itu.int/rec/T-REC-H.265-201612-I/en annex G and I).

Density information associated with the picture 100 is further encoded by the encoder ENC1.

The encoded data may be stored and/or transmitted in the bitstream 902.

In an operation 102, the encoded data of the picture 100 is decoded by a decoder DEC1. The decoder DEC1 is compliant with the encoder ENC1, for example compliant with a legacy decoder such as:
JPEG,
AVC, also named MPEG-4 AVC or h264,
HEVC, or
3D-HEVC (an extension of HEVC).

The attributes, encoded at operation 101, are decoded and retrieved, at operation 102, for example stored in a buffer memory, for use in the generation of a reference picture 103 associated with the picture 100.

The reference picture 103 may be used in an operation 104, implemented by a module M104. The operation 104 comprises for example the generation of predictors for inter prediction for the coding of one or more pictures of the point cloud, different from the picture 100 (e.g. pictures of the point cloud at determined times different from the time 't' of picture 100). The point cloud 901, or pictures representing the point cloud, may then be encoded by referring to the reference picture 103. According to a variant, the module M104 is part of the encoder ENC1.

Naturally, a plurality of reference pictures may be obtained in a same way as the reference picture 103, each reference picture of the plurality being obtained from a specific picture representing the point cloud, the encoding of the point cloud 901 referring to one or several reference pictures.

FIG. 11 shows operations for decoding the encoded version of the point cloud 901 from the bitstream 902, according to a particular and non-limiting embodiment of the present principles. The operations may be part of the decoding process 92 and may be implemented by the apparatus 12 of FIG. 12.

In an operation 111, encoded data of one or more pictures (e.g. pictures of one or more GOPs or of an intra period) of the point cloud is decoded by a decoder DEC2 from a received bitstream 902. The bitstream 902 comprises the encoded data of the one or more pictures with information representative of density associated with the one or more pictures. The picture may comprise a set of images, each image corresponding to a patch (i.e. a depth map or a texture map), each comprising attributes, e.g. depth and/or texture attributes. Attributes associated with the set of images are obtained from the decoding operation 111. The attributes may correspond to texture (or color) information and/or depth (or distance to a view point) information. The decoder DEC2 may correspond to the decoder DEC1 of FIG. 12 and is for example compliant with a legacy decoder such as:
JPEG,
AVC, also named MPEG-4 AVC or H264,
HEVC, or
3D-HEVC (an extension of HEVC).

The encoded density information comprised in the bitstream 902 is decoded by the decoder DEC2 during operation 111.

The attributes decoded at operation 111 are retrieved, for example stored in a buffer memory, for use in the generation of one or more reference pictures 112, each reference picture being associated with one picture.

A reference picture 112 (that may be identical to the reference picture 103 of FIG. 10) may be obtained from the decoded picture. The reference picture may comprise the same structure than the picture, i.e. the same spatial arrangement of the set of images.

The reference picture 112 may be used in an operation 113, implemented by a module M113. The operation 113 comprises for example the generation of the predictors for inter prediction from the decoding of the encoded data comprised in the bitstream. These data, associated to the generation of the predictor, may comprise
a prediction type, for instance a flag indicating if the prediction mode is intra or inter,
a motion vector, and/or
an index to indicate a reference picture from a list of reference pictures.

Naturally, a plurality of reference pictures may be obtained in a same way as the reference picture 113, each reference picture of the plurality being obtained from decoded data of a specific picture representing the point cloud, the decoding of the data of the bitstream 902 may be based on one or several reference pictures to obtain a decoded point cloud 903.

The decoded point cloud 903 may then be further processed for reconstructing the 3D representation of the scene from the decoded pictures that comprise the attributes (depth and texture), from the decoded density information, from the decoded parameters representative of the 2D parameterizations and from the decoded mapping information for the mapping between the 2D parameterizations and the depth and texture maps comprised in the decoded pictures. Points of the point cloud are obtained by de-projecting the pixels of the depth and texture maps according to the inverse 2D parameterizations. The geometry of the point cloud (i.e. coordinates of the points or distance from a point of view associated with the 2D parameterization) is obtained by de-projecting the depth maps and the texture associated with the points of the point cloud is obtained from the texture maps. The points obtained from the de-projection of the depth and texture maps are called reconstructed points in the following.

Parts of the reconstructed point cloud identified, from the decoded density information, as having a points density less than the determined density level may be further processed.

Additional points may be generated between pairs of reconstructed points obtained from the decoded bitstream. The additional points may be generated by computing their associated depth and texture from the depth and texture associated with the reconstructed points. The number of generated additional points may for example be a function of the distances separating the reconstructed points, the greater the distance, the greater the number of additional points. The number of generated additional points may be determined according to a determined target density level, this determined target density level being further defined by a user or corresponding to a level of desired quality level of the rendering of the scene. According to another example, the target density level is set equal to the average density of the parts of the reconstructed point cloud having a density greater than said determined level.

The additional points generated between the reconstructed points may receive as texture information the mean value of the texture values associated with the reconstructed points used to generate them and as depth information the mean value of the depth value associated with the reconstructed points used to generate them. According to another example, the texture information to be associated with a generated additional point corresponds to the texture information of one of the reconstructed point used to generate it.

According to a variant, an up-sampling process (such as the one described in "*Computing and rendering point set surfaces*" by M. Alexa, J. Behr, D. Cohen-Or, S. Fleishman, D. Levin, C. T. Silva, in IEEE TVCG9, January 2009) is applied to the parts of the point cloud identified, from the decoded density information, as having a points density less than the determined density level.

FIG. 12 shows an example architecture of a device 12 which may be configured to implement a method described in relation with FIGS. 10, 11, 15 and/or 16. The device 12 may be configured to be an encoder 91, 131 or a decoder 92, 132 of FIGS. 9 and 13.

The device 12 comprises following elements that are linked together by a data and address bus 121:
- a microprocessor 122 (or CPU), which is, for example, a DSP (or Digital Signal Processor);
- a ROM (or Read Only Memory) 123;
- a RAM (or Random-Access Memory) 124;
- a storage interface 125;
- an I/O interface 126 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 123 comprises at least a program and parameters. The ROM 123 may store algorithms and instructions to perform techniques in accordance with present principles. When switched on, the CPU 122 uploads the program in the RAM and executes the corresponding instructions.

The RAM 124 comprises, in a register, the program executed by the CPU 122 and uploaded after switch-on of the device 120, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 91, 131, the three-dimension scene 10 is obtained from a source. For example, the source belongs to a set comprising:
- a local memory (123 or 124), e.g. a video memory or a RAM (or Random-Access Memory), a flash memory, a ROM (or Read Only Memory), a hard disk;
- a storage interface (125), e.g. an interface with a mass storage, a RAM, a flash memory, a ROM, an optical disc or a magnetic support;
- a communication interface (126), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 92, 132, the stream is sent to a destination; specifically, the destination belongs to a set comprising:
- a local memory (123 or 124), e.g. a video memory or a RAM, a flash memory, a hard disk;
- a storage interface (125), e.g. an interface with a mass storage, a RAM, a flash memory, a ROM, an optical disc or a magnetic support; and
- a communication interface (126), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory or a RAM, a hard disk. In a variant, the bitstream is sent to a storage interface, e.g. an interface with a mass storage, a flash memory, ROM, an optical disc or a magnetic support and/or transmitted over a communication interface, e.g. an interface to a point to point link, a communication bus, a point to multipoint link or a broadcast network.

In accordance with examples of decoding or decoder or renderer, the bitstream is obtained from a source. Exemplarily, the bitstream is read from a local memory, e.g. a video memory, a RAM, a ROM, a flash memory or a hard disk. In a variant, the bitstream is received from a storage interface, e.g. an interface with a mass storage, a RAM, a ROM, a flash memory, an optical disc or a magnetic support and/or received from a communication interface, e.g. an interface to a point to point link, a bus, a point to multipoint link or a broadcast network.

In accordance with examples, the device 12 is configured to implement a method described in relation with FIGS. 10, 11, 15 and/or 16, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

In accordance with an example illustrated in FIG. 13, in a transmission context between two remote devices 131 and 132 (of the type of the apparatus 12) over a communication network NET 130, the device 151 comprises means which are configured to implement a method for encoding data as described in relation with the FIGS. 10 and/or 15, and the device 132 comprises means which are configured to implement a decoding method as described in relation with FIGS. 11 and/or 16.

In accordance with an example, the network 130 is a LAN or WLAN network, adapted to broadcast still pictures or video pictures with associated audio information from device 131 to decoding/rendering devices including the device 132.

In accordance with a further example, the network is a broadcast network adapted to broadcast encoded 3D representation (e.g. point cloud(s) or mesh) from device 131 to decoding devices including the device 132.

A signal, intended to be transmitted by the device 131, carries the bitstreams 14.

FIG. 14 shows an example of an embodiment of the syntax of such a signal when the data are transmitted over a packet-based transmission protocol. FIG. 14 shows an example structure 14 of a volumetric content stream. The structure consists in a container which organizes the stream in independent syntax elements.

The structure may comprise a header part 141 which is a set of data common to every syntax elements of the stream. For example, the header part contains metadata about syntax elements, describing the nature and the role of each of them.

The structure may comprise a payload comprising syntax elements 142 to 146. The first syntax element 142 is for example relative to the parameters defining the 2D parameterizations. The second syntax element 143 is for example relative to the data representative of the depth map(s). The third syntax element 144 is for example relative to the data representative of the texture map(s). The fourth syntax element 145 is for example relative to the information relative to the density of at least a part of the 3D representation of the 3D scene. The fifth syntax element 146 is for example relative to the information relative to the mapping between the 2D parameterizations and the corresponding depth and texture maps.

For illustration purpose, in the context of ISOBMFF file format standard, the texture map, depth map and the metadata would typically be referenced in ISOBMFF tracks in a box of type 'moov', with the texture map and depth map data themselves embedded in media-data box of type 'mdat'.

FIG. 15 illustrates a method for encoding data representative of a 3D representation of scene, for example the 3D scene 10, according to a non-restrictive embodiment of the present principles. The method may for example be implemented in the encoder 91, 131 and/or in the device 12. The different parameters of the device 12 may be updated. The 3D representation may for example be obtained from a source, one or more points of view may be determined in the space of the 3D scene, parameters associated with projection mapping(s) and/or 2D parameterization(s) may be initialized.

In a first operation 151, one or more depth maps are generated, each depth map being associated with a part of the 3D representation of the scene. The depth maps are each generated from parameter(s) of 2D parameterizations that are each associated with one part of the 3D representation and from geometrical information associated with the points comprised in the part of the 3D representation the 2D parameterization is associated with. Each depth map may for example correspond to a patch of a first patch atlas and is associated with one 2D parameterization of one part of the 3D representation. The 2D parameterization associated with a part of the 3D representation is a 2D pixel/sample representation of the 3D implicit surface obtained from the geometrical data associated with the points comprised in said part, the location of the 2D parameterization in the space of the scene and the point of view associated with the 2D parameterization being according to the pose information associated with the range of points of view from which the 3D representation is seen. The 2D parameterization may for example be located in such a way to be between the surface of the scene represented by the 3D representation and the range of points of view, i.e. the 2D surface obtained with the 2D parameterization faces the part it is associated with. One or more 2D parameterizations are generated for each part or for each part of a part only of the 3D representation. According to a variant, a single 2D parameterization is generated for the whole 3D representation. When data is associated with pixels of depth maps, this data corresponds to distance or depth information.

In a second operation 152, one or more texture maps are generated, each texture map being associated with a part of the 3D representation of the scene. The texture map is generated from the parameters of the 2D parameterizations that are each associated with one part of the 3D representation and from texture/color information associated with the points comprised in the part of the 3D representation the 2D parameterization is associated with. Each texture map may for example correspond to a patch of a second patch atlas and is associated with one 2D parameterization of one part of the 3D representation. The data associated with the pixels of the texture maps may correspond to color (e.g., Red, Green, Blue or Cyan, Magenta, Yellow, Black) information.

In a third operation 153, a first information representative of point density of the points comprised in one or more of the parts of the 3D representation is generated. The first information associated with a given part of the 3D representation may comprise one or more of the following information:
  an information indicating that the point density of the points comprised in the given part is greater than or below than a determined density level. The determined density level may for example be a level/value set by a user or a level/value determined (calculated) according to, for example, the average density of the object or zone of the scene the given part belongs to;
  an information indicating the range of point density determined for the given part;
  an information indicating the average point density of the points comprised in the given part; and/or
  an information indicating all point density determined within the given part.

In a fourth operation 154, the at least a depth map is encoded into a first syntax element of a bitstream; the at least a texture map is encoded into a second syntax element of the bitstream; the at least a parameter is encoded into a third syntax element; the first information is encoded into a fourth syntax element; and a second information representative of a mapping between the 2D parameterization(s) and corresponding depth map(s) and texture map(s) is encoded into a fifth syntax element of the bitstream.

FIG. 16 illustrates a method for decoding data representative of a 3D representation of a scene, for example the 3D scene 10, according to a non-restrictive embodiment of the present principles. The method may for example be implemented in the decoder 92, 132 and/or in the device 12.

In a first operation 161, at least a parameter representative of at least a two-dimensional parameterization of at least a part of the 3D representation is decoded from a received bitstream.

In a second operation 162, the data representative of at least a texture map associated with the at least a part of the 3D representation is decoded from the bitstream.

In a third operation 163, the data representative of at least a depth map associated with the at least a part of the 3D representation is decoded from the bitstream.

In a fourth operation 164, the data associated with at least a point comprised in the at least a part of said 3D representation is determined from the at least a parameter, the data representative of the texture map(s), the data representative of the depth map(s), a first information obtained/decoded from the bitstream and representative of the points comprised in one or more of the parts of the 3D representation, and a second information obtained/decoded from the bitstream and representative of a mapping between the 2D parameterization(s) and corresponding depth and texture maps.

The decoded data and information may further be used to generate/reconstruct a 3D representation of the 3D scene for the rendering and/or displaying of the reconstructed 3D scene. The reconstructed 3D scene may be seen from the range of points of view, which may generate some rendering quality issues, especially when watching the 3D scene according to a point of view that enables to see areas of the scene identified as having a low point density (via the first information). To overcome these issues, an up-sampling process may be applied to the areas of the scene having a point density below the determined level/value to increase the number of points.

Splat rendering may then be applied to the reconstructed 3D representation (also to the parts that have been up-sampled) to generate/render the scene. Splat rendering is a technique that allows to fill hole between points, that are dimension-less, in a point cloud. It consists in estimating for each point of the point cloud based on its neighborhood an oriented ellipse, i.e. the two demi-axes and the normal of the ellipse.

The quality of the rendering of the 3D scene is increased by adding a small amount of data (i.e. the first information) to the bitstream Naturally, the present disclosure is not limited to the embodiments previously described.

In particular, the present disclosure is not limited to a method and device for encoding/decoding data representative of a 3D scene but also extends to a method for generating a bitstream comprising the encoded data and to any device implementing this method and notably any devices comprising at least one CPU and/or at least one GPU.

The present disclosure also relates to a method (and a device configured) for displaying images rendered from the decoded data of the bitstream.

The present disclosure also relates to a method (and a device configured) for transmitting and/or receiving the bitstream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a three-dimensional point cloud in a bitstream, the method comprising, for at least a part of the three-dimensional point cloud:
determining a depth map and a texture map of the part of the three-dimensional point cloud according to a two-dimensional parametrization responsive to geometric characteristics of the part and pose information associated with a range of points of view used to capture the three-dimensional point cloud;
obtaining a first information comprising an indication of whether the part has a point density below a determined density value; and
encoding, into the bitstream, the depth map, the texture map, the two-dimensional parametrization, the first information, and a second information representative of a mapping between the two-dimensional parametrization and the depth map and the texture map.

2. The method according to claim 1, wherein the first information is obtained by detecting at least a boundary between objects of the point cloud in at least an image of the point cloud according to a point of view comprised in the range of points of view.

3. The method according to claim 1, wherein the first information is obtained by calculating a number of points comprised in the part and by comparing the point density with the determined density value.

4. A non-transitory computer readable medium comprising computer-executable instructions to enable a processor to perform the method of claim 1.

5. A non-transitory computer readable medium storing data content generated according to the method of claim 1.

6. A device for encoding a three-dimensional point cloud in a bitstream, the device comprising a processor configured to, for at least a part of the three-dimensional point cloud:
determine a depth map and a texture map of the part of a three-dimensional point cloud according to a two-dimensional parametrization responsive to geometric characteristics of the part and pose information associated with a range of points of view used to capture the three-dimensional point cloud;
obtain a first information comprising an indication of whether the part has a point density below a determined density value;
encode, into the bitstream, the depth map, the texture map, the two-dimensional parametrization, the first information, and a second information representative of a mapping between the two-dimensional parametrization and the depth map and the texture map.

7. The device according to claim 6, wherein the first information is obtained by detecting at least a boundary between objects of the point cloud in at least an image of the point cloud according to a point of view comprised in the range of points of view.

8. The device according to claim 6, wherein the first information is obtained by calculating a number of points comprised in the part and by comparing the point density with the determined density value.

9. A non-transitory computer readable medium storing data content generated by the device of claim 6.

10. A method comprising, for at least one part of a three-dimensional point cloud:
decoding, from a bitstream, a two-dimensional parametrization responsive to geometric characteristics of the part and pose information associated with a range of points of view used to capture the three-dimensional point cloud;
decoding, from the bitstream, a texture map and a depth map of the part;
de-projecting the texture map and the depth map according to a first information obtained from the bitstream and comprising an indication of whether the part has a point density below a determined density value, and a second information obtained from the bitstream and representative of a mapping between the two-dimensional parametrization and the texture map and the depth map.

11. The method according to claim 10, wherein additional points are generated in parts of the three-dimensional point cloud having a point density below the determined density value in addition to the points obtained from the texture map and the depth map.

12. A non-transitory computer readable medium comprising computer-executable instructions to enable a processor to perform the method of claim 10.

13. A non-transitory computer readable medium storing data content generated according to the method of claim 10.

14. A device comprising a memory associated with at least one processor configured to, for at least one part of a three-dimensional point cloud:
decode, from a bitstream, a two-dimensional parametrization responsive to geometric characteristics of the part and pose information associated with a range of points of view used to capture the three-dimensional point cloud;
decode, from the bitstream, a texture map and a depth map of the part;
de-project the texture map and the depth map according to a first information obtained from the bitstream and comprising an indication of whether the part has a point density below a determined density value, and a second information obtained from the bitstream and representative of a mapping between the two-dimensional parametrization and the texture map and the depth map.

15. The device according to claim 14, wherein additional points are generated in parts of the three-dimensional point cloud having a point density below the determined density value in addition to the points obtained from the texture map and the depth map.

16. A non-transitory computer readable medium storing data content generated by the device of claim 14.

* * * * *